United States Patent
Kim et al.

(10) Patent No.: US 11,894,605 B2
(45) Date of Patent: Feb. 6, 2024

(54) ELECTRONIC DEVICE INCLUDING ANTENNA

(71) Applicant: Samsung Electronics Co., Ltd., Suwon-si (KR)

(72) Inventors: Hyunsuk Kim, Suwon-si (KR); Youngmin Kang, Suwon-si (KR); Jooyoung Kang, Suwon-si (KR); Sanghyuk Park, Suwon-si (KR); Soohyun Seo, Suwon-si (KR); Moonchul Shin, Suwon-si (KR); Seungjoon Lee, Suwon-si (KR); Hojin Jung, Suwon-si (KR); Nakhyun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/238,902

(22) Filed: Apr. 23, 2021

(65) Prior Publication Data
US 2022/0115772 A1    Apr. 14, 2022

(30) Foreign Application Priority Data

Oct. 12, 2020  (KR) .................. 10-2020-0131427
Nov. 5, 2020  (KR) .................. 10-2020-0146726

(51) Int. Cl.
*H01Q 3/02*     (2006.01)
*H01Q 3/12*     (2006.01)
(Continued)

(52) U.S. Cl.
CPC .............. *H01Q 1/244* (2013.01); *H01Q 3/02* (2013.01); *H01Q 3/12* (2013.01); *H04M 1/0237* (2013.01); *H04M 1/0268* (2013.01)

(58) Field of Classification Search
CPC .......... H01Q 1/24; H01Q 1/242; H01Q 1/243; H01Q 1/244; H01Q 1/50; H01Q 5/321;
(Continued)

(56) References Cited

U.S. PATENT DOCUMENTS 5,921,783 A * 7/1999 Fritsch ................. H01R 13/703
                                                        439/700
10,090,578 B2 * 10/2018 Wolentarski ........... H01Q 1/245
(Continued)

FOREIGN PATENT DOCUMENTS

KR        100702674 B1 *  4/2007
KR        10-0726234 B1    6/2007
(Continued)

OTHER PUBLICATIONS

Teflon—Polytetrafluoroethylene (PTFE), created on Feb. 27, 2019, Dielectric Manufacturing website, https://dielectricmfg.com/resources/knowledge-base/teflon/ (Year: 2019).*
(Continued)

*Primary Examiner* — Ab Salam Alkassim, Jr.
*Assistant Examiner* — Anh N Ho
(74) *Attorney, Agent, or Firm* — Jefferson IP Law, LLP

(57) ABSTRACT

An electronic device is provided. The electronic device includes a first housing including a first conductive portion, a second housing slidably coupled to the first housing at a designated round-trip distance and configured to include a second conductive portion overlapping at least a part of the first conductive portion in a slide-in state, a wireless communication circuit disposed in the electronic device and electrically connected to the first conductive portion, and at least one electrical connection structure disposed in a second space of the second housing and configured to electrically connect the second conductive portion to the first conductive portion in the slide-in state. The wireless communication
(Continued)

circuit may be configured to transmit and/or receive a radio signal in at least one frequency band through the first conductive portion and the second conductive portion in the slide-in state.

16 Claims, 26 Drawing Sheets

(51) Int. Cl.
  *H01Q 1/24* (2006.01)
  *H04M 1/02* (2006.01)
(58) Field of Classification Search
  CPC ......... H01Q 3/02; H01Q 3/12; H04M 1/0237;
       H04M 1/0268; H04M 1/0249; H04M
       1/0266; H04M 1/0227; H04M 1/0247;
       H04M 1/0241; H04M 1/0235–0239;
       H01R 13/70; H01R 13/703; H01R
       2201/02; H04W 88/06; G06F 1/1624;
       G06F 1/1615; H05K 7/1427; G09F 9/301;
       G09G 2380/02
  See application file for complete search history.

(56) References Cited

U.S. PATENT DOCUMENTS

| | | | | |
|---|---|---|---|---|
| 2006/0142073 | A1* | 6/2006 | Gordecki | H04M 1/0237 |
| | | | | 455/575.4 |
| 2007/0021161 | A1* | 1/2007 | Autti | H01Q 9/0421 |
| | | | | 455/575.7 |
| 2009/0224982 | A1* | 9/2009 | Isoda | H01Q 9/16 |
| | | | | 343/702 |
| 2010/0227657 | A1* | 9/2010 | Mashima | H01Q 1/243 |
| | | | | 455/575.4 |
| 2011/0095962 | A1 | 4/2011 | Ishii | |
| 2014/0211399 | A1* | 7/2014 | O'Brien | G06F 1/1624 |
| | | | | 29/592.1 |
| 2017/0047635 | A1 | 2/2017 | Wolentarski et al. | |
| 2017/0142241 | A1* | 5/2017 | Kim | H01Q 5/385 |
| 2019/0103656 | A1 | 4/2019 | Shi et al. | |
| 2020/0136231 | A1 | 4/2020 | Lee et al. | |
| 2020/0363841 | A1 | 11/2020 | Kim et al. | |
| 2021/0328329 | A1 | 10/2021 | Kim et al. | |
| 2021/0359392 | A1* | 11/2021 | Won | H01Q 21/28 |
| 2021/0377372 | A1 | 12/2021 | Jung et al. | |

FOREIGN PATENT DOCUMENTS

| | | | |
|---|---|---|---|
| KR | 20080073489 | A * | 8/2008 |
| KR | 20090126707 | A * | 12/2009 |
| KR | 10-2017-0056292 | A | 5/2017 |
| KR | 10-2017-0116262 | A | 10/2017 |
| KR | 10-2019-0115888 | A | 10/2019 |
| KR | 10-2019-0143029 | A | 12/2019 |
| KR | 10-2020-0025439 | A | 3/2020 |
| KR | 10-2020-0041970 | A | 4/2020 |
| KR | 10-2020-0046303 | A | 5/2020 |
| WO | 2019/107909 | A1 | 6/2019 |
| WO | WO-2019245165 | A1 * | 12/2019 ........... G06F 1/1624 |
| WO | 2020/085791 | A1 | 4/2020 |

OTHER PUBLICATIONS

International Search Report dated Jul. 15, 2021, issued in International Patent Application No. PCT/KR2021/004250.
Extended European Search Report dated Sep. 27, 2023, issued in European Patent Application No. 21880261.9.

* cited by examiner

ELECTRONIC DEVICE INCLUDING ANTENNA

CROSS-REFERENCE TO RELATED APPLICATION(S)

This application is based on and claims priority under 35 U.S.C. § 119(a) of a Korean patent application number 10-2020-0131427, filed on Oct. 12, 2020, in the Korean Intellectual Property Office, and of a Korean patent application number 10-2020-0146726, filed on Nov. 5, 2020, in the Korean Intellectual Property Office, the disclosure of each of which is incorporated by reference herein in its entirety.

BACKGROUND

1. Field

The disclosure relates to an electronic device including an antenna.

2. Description of Related Art

An electronic device gradually becomes thinner & smaller and is developed to increase stiffness, reinforce a design aspect and also differentiate a functional element thereof. The electronic device moves away from a uniform rectangular shape and gradually changes into various shapes. The electronic device may have a deformable structure which can be conveniently carried and may use a large-screen display. For example, as part of a deformable structure, an electronic device may have a structure (e.g., a rollable structure) in which the area of a display visible to the outside varies through at least two housings operating in a sliding manner and a flexible display supported by the housings.

The above information is presented as background information only to assist with an understanding of the disclosure. No determination has been made, and no assertion is made, as to whether any of the above might be applicable as prior art with regard to the disclosure.

SUMMARY

An electronic device may include a slidable electronic device (e.g., a rollable electronic device) in which the area of a display visible to the outside can be expanded or reduced. The slidable electronic device may include a first housing (e.g., a base housing) and a second housing (e.g., a slide housing) which may be movably coupled with respect to each other in a way that the first and second housings are at least partially fitted together, for example. The electronic device may include a flexible display (or an expandable display) in which the area of a display visible to the outside varies through a sliding operation for the second housing sliding in or sliding out in a designated direction and a designated round-trip distance with respect to at least a part of the first housing. The slidable electronic device may include at least one conductive portion, which is disposed to be at least partially visible to the outside and electrically connected to a wireless communication circuit and operates in at least one frequency band in the first housing and/or the second housing. For example, the at least one conductive portion used as an antenna may be formed by fragmenting a conductive material (e.g., a metal material), provided for stiffness reinforcement and/or an attractive appearance of the slidable electronic device, through at least one non-conductive portion (e.g., a polymer fraction part).

However, in the case of the slidable electronic device, radiation performance of the antenna is not constant and may deteriorate due to the intervention of a counterpart conductive structure because the first housing and the second housing are disposed to at least partially overlap in the slide-in state.

Aspects of the disclosure are to address at least the above-mentioned problems and/or disadvantages and to provide at least the advantages described below. Accordingly, an aspect of the disclosure is to provide an electronic device including antenna, which can always have excellent radiation performance regardless of a slide-in/slide-out operation.

Additional aspects will be set forth in part in the description which follows and, in part, will be apparent from the description, or may be learned by practice of the presented embodiments.

In accordance with an aspect of the disclosure, an electronic device is provided. The electronic device includes antenna, which may help improving reliability of the device because the electronic device has a physical connection structure for maintaining designated radiation performance of an antenna even if the electronic device is used for a long time.

In accordance with another aspect of the disclosure, an electronic device is provided. The electronic device includes a first housing including a first conductive portion, a second housing slidably coupled to the first housing at a designated round-trip distance and configured to include a second conductive portion overlapping at least a part of the first conductive portion in a slide-in state, a wireless communication circuit disposed in the electronic device and electrically connected to the first conductive portion, and at least one electrical connection structure disposed in a second space of the second housing and configured to electrically connect the second conductive portion to the first conductive portion in the slide-in state, wherein the wireless communication circuit may be configured to transmit and/or receive a radio signal in at least one frequency band through the first conductive portion and the second conductive portion in the slide-in state.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
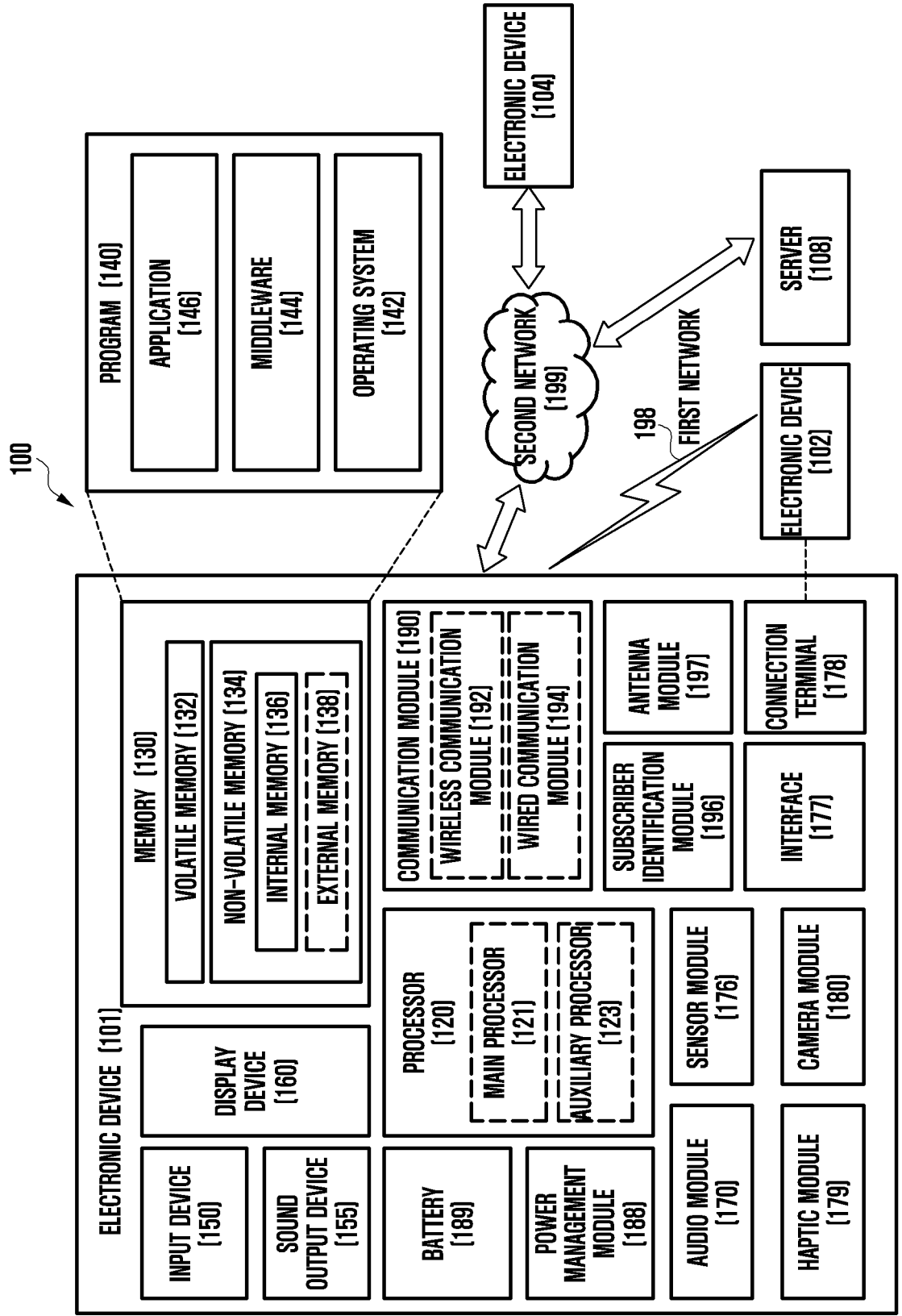
FIG. 1 is a block diagram of an electronic device within a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
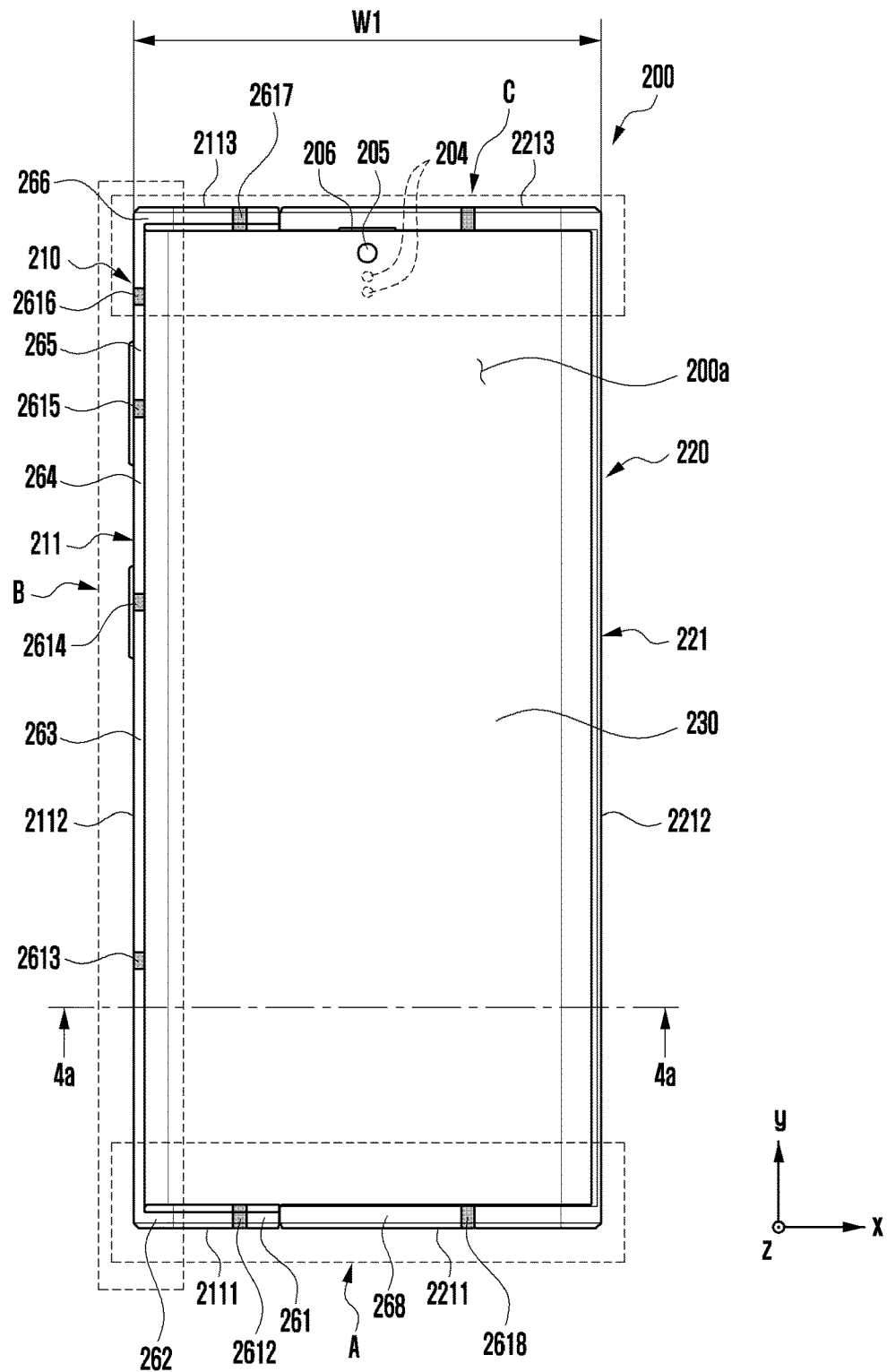
FIGS. 2A and 2B are diagrams illustrating the front of an electronic device in a slide-in state and a slide-out state according to various embodiments of the disclosure.
Figure 2B:
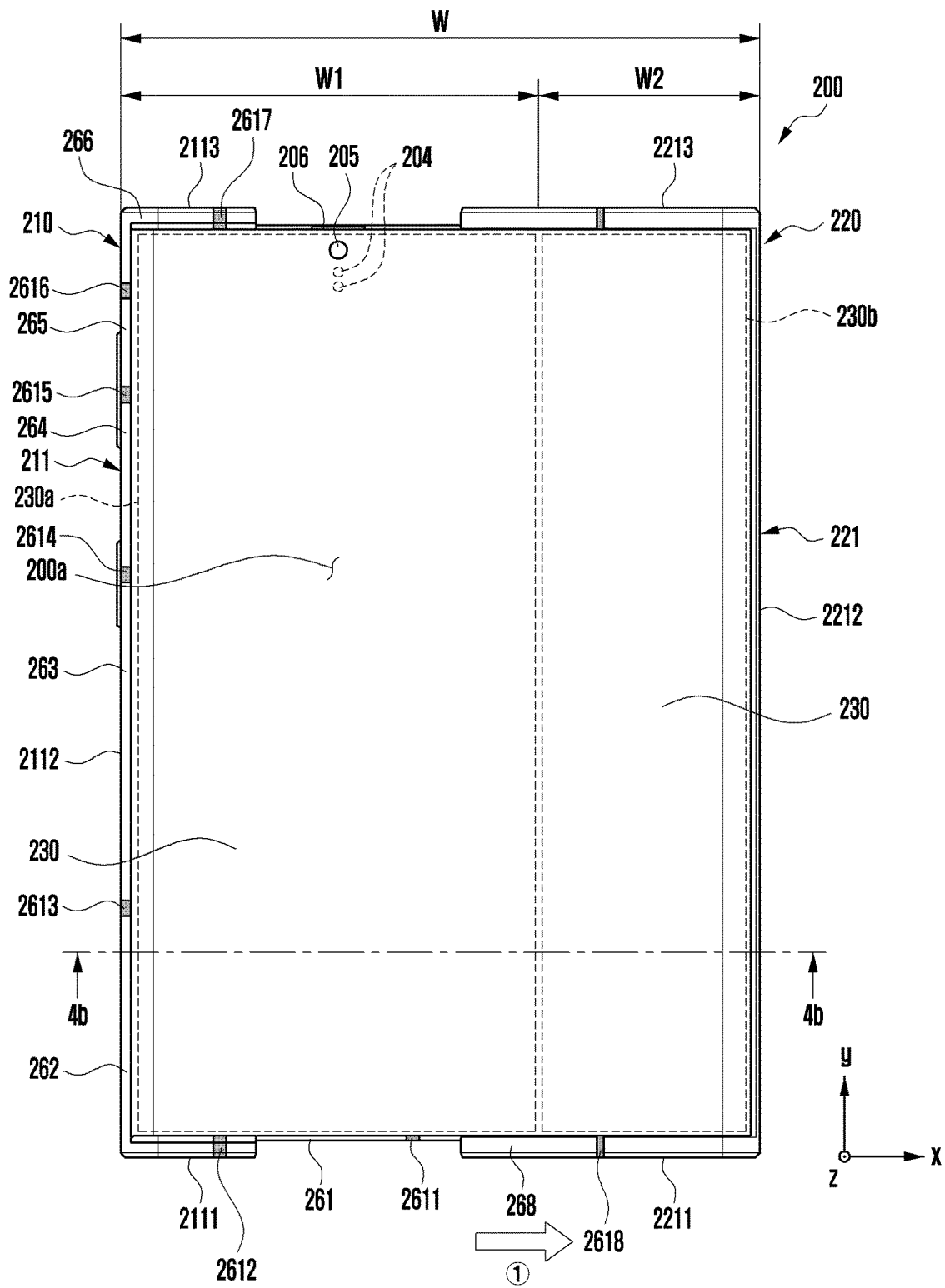

FIGS. 2A and 2B are diagrams illustrating a front of an electronic device in a slide-in state and a slide-out state according to various embodiments of the disclosure.

Figure 3A:
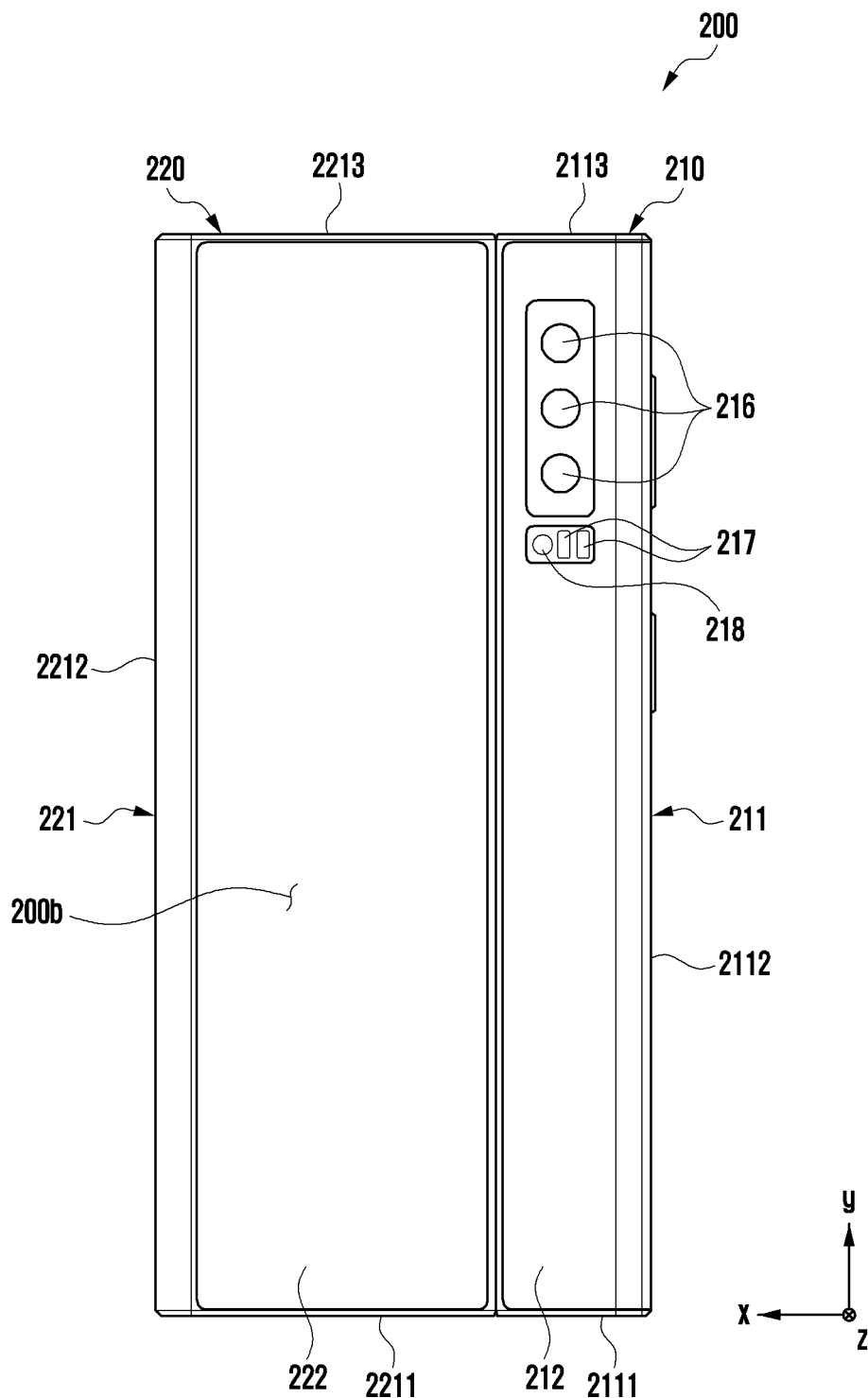
FIGS. 3A and 3B are diagrams illustrating a back of an electronic device in a slide-in state and a slide-out state according to various embodiments of the disclosure.
Figure 3B:
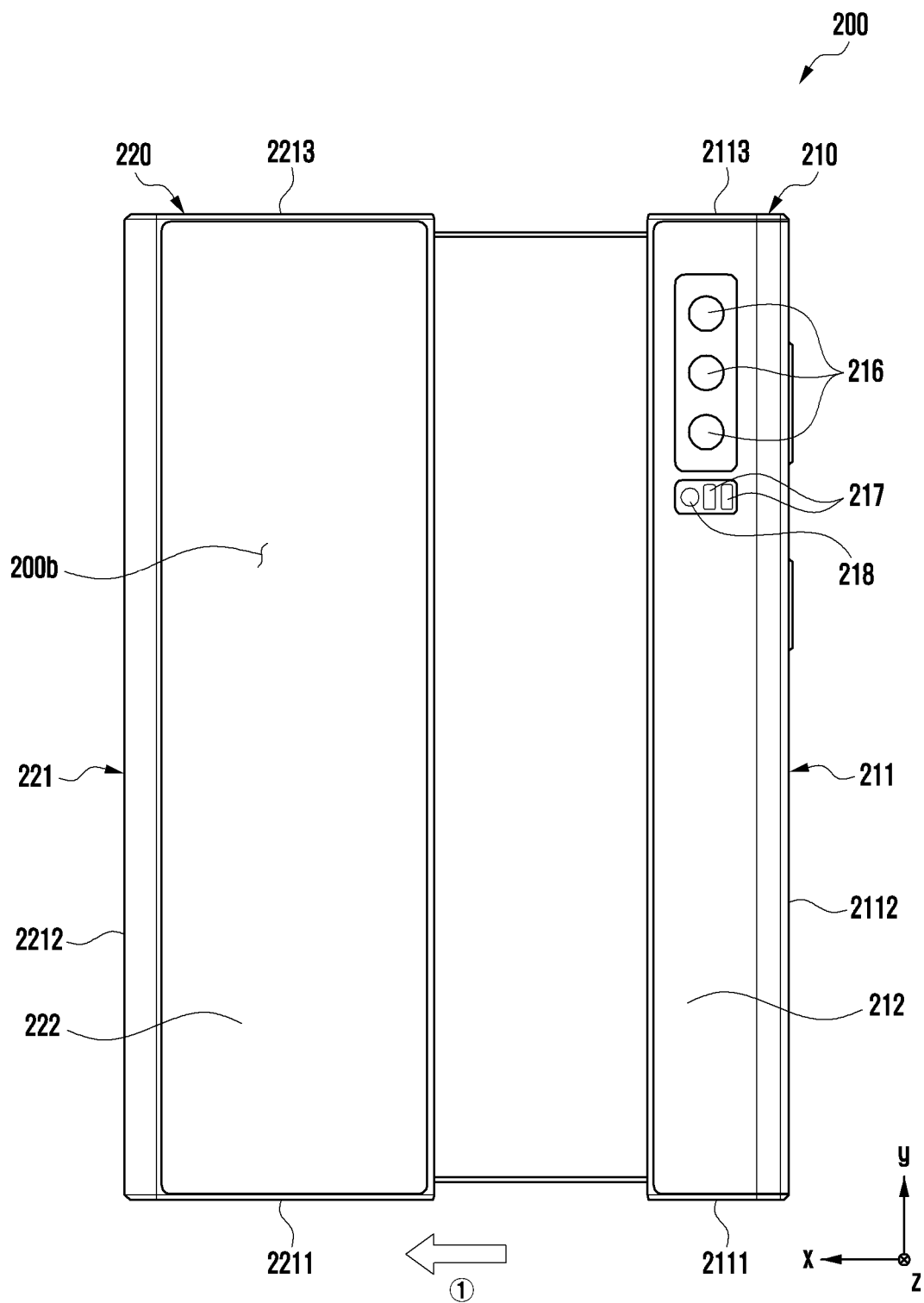

FIGS. 3A and 3B are diagrams illustrating a back of an electronic device in a slide-in state and a slide-out state according to various embodiments of the disclosure.

Referring to FIGS. 2A to 3B, an electronic device 200 may include a first housing 210 (e.g., a base housing), a second housing 220 (e.g., a slide structure) coupled to the first housing 210 in a way to be movable at a designated maximum round-trip distance from the first housing 210 in a designated direction (e.g., an X-axis direction), and a flexible display 230 (e.g., an expandable display) disposed to be supported by at least a part of the first housing 210 and the second housing 220. According to one embodiment, the electronic device 200 may include a bendable member (or a bendable support member) (e.g., a bendable member 240 in FIG. 6A) (e.g., a hinge rail or a multi joint hinge module) configured to form the same plane along with at least a part of the first housing 210 in a slide-out state and received in an internal space (e.g., a second space 2201 in FIG. 6A) of the second housing 220 in a slide-in state. According to one embodiment, at least a part of the flexible display 230 may be disposed in a way to be not visible to the outside by being supported by the bendable member (e.g., the bendable member 240 in FIG. 6A) in the slide-in state and received in the internal space (e.g., the second space 2201 in FIG. 6A) of the second housing 220. According to one embodiment, at least a part of the flexible display 230 may be disposed in a way to be visible to the outside by being supported by the bendable member (e.g., the bendable member 240 in FIG. 6A) at least partially forming the same plane along with the first housing 210 in the slide-out state.

According to various embodiments, the electronic device 200 may include a front 200a (e.g., a first face), a back 200b (e.g., a second face) that faces a direction opposite to the front 200a, and a side (not illustrated) surrounding the space between the front 200a and the back 200b. According to one embodiment, the electronic device 200 may include the first housing 210 including a first side member 211 and the second housing 220 including a second side member 221. According to one embodiment, the first side member 211 may include a first side 2111 having a first length in a first direction (X-axis direction), a second side 2112 extended to have a second length longer than the first length in a direction substantially perpendicular to the first side 2111, and a third side 2113 extending from the second side 2112 substantially in parallel to the first side 2111 and substantially having the first length. According to one embodiment, at least a part of the first side member 211 may be made of a conductive material (e.g., metal). According to one embodiment, at least a part of the first side member 211 may be extended up to at least a part of an internal space (e.g., a first space 2101 in FIG. 6A) of the first housing 210.

According to various embodiments, the second side member 221 may include a fourth side 2211 facing the first side 2111 and having a third length, a fifth side 2212 extending from the fourth side 2211 in a direction substantially parallel to the second side 2112 and having a fourth length longer than the third length, and a sixth side 2213 extending from the fifth side 2212 substantially in parallel to the third side 2113 and having a fifth length. According to one embodiment, at least a part of the second side member 221 may be made of a conductive material (e.g., metal). According to one embodiment, at least a part of the second side member 221 may be extended up to at least a part of the internal space (e.g., the second space 2201 in FIG. 6A) of the second housing 220. According to one embodiment, the first side 2111 and the fourth side 2211, and the third side 2113 and the sixth side 2213 may be coupled in a way to be slidable with respect to each other. For example, in the slide-in state, at least a part of the first side 2111 may be disposed to overlap at least a part of the fourth side 2211. According to one embodiment, in the slide-in state, at least a part of the third side 2113 may be disposed to overlap at least a part of the sixth side 2213. According to one embodiment, the area of the front 200*a* and back 200*b* of the electronic device 200 may vary in the slide-in state and slide-out state of the electronic device 200.

According to various embodiments, the electronic device 200 may include a first back cover 212 disposed in at least a part of the first housing 210 and a second back cover 222 disposed in at least a part of the second housing 220, in the back 200*b*. According to one embodiment, the first back cover 212 may be integrated with the first side member 211. According to one embodiment, the second back cover 222 may be integrated with the second side member 221. According to one embodiment, the first back cover 212 and/or the second back cover 222 may be made of polymer, coated or colored glass, ceramic, metal (e.g., aluminum, stainless steel (STS), or magnesium), or a combination of at least two of the materials. In an embodiment, the first back cover 212 and/or the second back cover 222 may be extended up to at least a part of the first side member 211 or the second side member 221.

According to various embodiments, the electronic device 200 may include the flexible display 230 disposed to be supported by at least a part of the first housing 210 and the second housing 220. According to one embodiment, the flexible display 230 may include a first region 230*a* (e.g., a fixed region or a planar part) fixed in a way to be always visible to the outside and a second region 230*b* (e.g., an extended region or a bendable part) extended from the first region 230*a* and extended in response to a slide-out operation of the electronic device. According to one embodiment, in the slide-in state of the electronic device 200, the second region 230*b* of the flexible display 230 may be disposed to slide into the internal space (e.g., the second space 2201 in FIG. 6A) of the second housing 220 and to be not visible to the outside. In the state in which the electronic device 200 has slid out in a designated first direction (direction ①), the second region 230*b* of the flexible display 230 may be extended from the first region 230*a*, while being supported by the bendable member (e.g., the bendable member 240 in FIG. 6A), and may be visible to the outside in a way to form substantially the same plane along with the first region 230*a*. Accordingly, when the second housing 220 of the electronic device 200 moves from the first housing 210 in the designated first direction (direction ①), a display area of the flexible display 230 may vary.

According to various embodiments, in the slide-in state or the slide-out state, the first region 230*a* of the flexible display 230 visible to the outside may be supported by at least a part of the first housing 210 and the bendable member 240. According to one embodiment, in the slide-out state, at least a part of the flexible display 230 may be supported by the bendable member 240, and may be maintained to be not visible to the outside in the internal space (e.g., the second space 2201 in FIG. 6B) of the second housing 220. According to one embodiment, a portion that belongs to the first region 230*a* or second region 230*b* of the flexible display 230 and that is visible to the outside may be an active region in which a screen is actually displayed. According to one embodiment, in the slide-out state, at least a part of the flexible display 230 located in the internal space (e.g., the second space 2201 in FIG. 6A) of the second housing 220 may be an inactive region in which a screen is not actually displayed. For example, content displayed in the active region may be changed depending on the state in which the flexible display 230 has slid out.

According to various embodiments, the first housing 210 may be coupled to the second housing 220 in a sliding manner so that the first housing 210 at least partially slides out from the second housing 220 or slides into at least a part of the second housing 220. According to one embodiment, the electronic device 200 may be configured to have a first width W1 from the second side 2112 to the fifth side 2212 in the slide-in state. According to one embodiment, in the slide-out state, the electronic device 200 may be configured to have a third width W greater than the first width W1, as the electronic device 200 moves so that the bendable member (e.g., the bendable member 240 in FIG. 6A) that has slid into the internal space (e.g., the first space 2101 in FIG. 6A) of the second housing 210 has an additional second width W2. Accordingly, the flexible display 230 may have a display area having substantially the first width W1 in the slide-in state, and may have an extended display area having substantially the third width W in the slide-out state.

According to various embodiments, the second housing 220 may operate in response to a user manipulation. For example, the slide-in state of the electronic device 200 may shift to the slide-out state in response to a user manipulation that pressurizes an outer surface of the flexible display 230 in the designated first direction (direction ①). In an embodiment, the electronic device 200 may operate so that the second housing 220 automatically slides out in the designated first direction (e.g., direction ①) in response to a manipulation for the button (not illustrated) of a locker (not illustrated) exposed to the outside. In an embodiment, the second housing 220 may automatically operate through a driving mechanism (e.g., a driving motor, a deceleration module and/or a gear assembly) disposed in the internal space (e.g., the first space 2101 in FIG. 6A) of the first housing 210 and/or the internal space (e.g., the second space 2201 in FIG. 6A) of the second housing 220. According to one embodiment, when detecting an event for changing the slide-in/slide-out state of the electronic device 200 through a processor (e.g., the processor 120 in FIG. 1), the electronic device 200 may be configured to control an operation of the second housing 220 through the driving mechanism. In an embodiment, the processor (e.g., the processor 120 in FIG. 1) of the electronic device 200 may control the flexible display 230 to display an object and display an application program in various ways in accordance with a changed display area of the flexible display 230 in the slide-in state, the slide-out state or an intermediate state between the slide-in state and the slide-out state.

According to various embodiments, the electronic device 200 may include at least one of an input device (not illustrated), a sound output device 206, sensor modules 204 and 217, camera modules 205 and 216, a connector port (not illustrated), a key input device (not illustrated) or an indicator (not illustrated). In another embodiment, the electronic device 200 may be configured to omit at least one of the aforementioned components or additionally include other components.

According to various embodiments, the input device may include a microphone. In an embodiment, the input device may include a plurality of microphones disposed to detect the direction of a sound. The sound output device 206 may include a speaker. The sound output device 206 may include a receiver for communication. In an embodiment, the sound output device 206 may include an external speaker. In an embodiment, the sound output device 206 may include a speaker (e.g., a piezo speaker) operating without a separate speaker hole.

According to various embodiments, the sensor modules 204 and 217 may generate an electrical signal or a data value corresponding to an operating state within the electronic device 200 or an external environment state. The sensor modules 204 and 217 may include a first sensor module 204 (e.g., a proximity sensor or an illuminance sensor) disposed in the front 200a of the electronic device 200 and/or a second sensor module 217 (e.g., a heart rate monitoring (HRM) sensor) disposed in the back 200b thereof, for example. According to one embodiment, the first sensor module 204 may be disposed under the flexible display 230 in the front 200a of the electronic device 200. According to one embodiment, the first sensor module 204 and/or the second sensor module 217 may include at least one of a proximity sensor, an illuminance sensor, a time of flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a bio sensor, a temperature sensor or a humidity sensor.

According to various embodiments, the camera modules 205 and 216 may include a first camera module 205 disposed in the front 200a of the electronic device 200 and a second camera module 216 disposed in the back 200b thereof. According to one embodiment, the electronic device 200 may include a flash 218 positioned near the second camera module 216. According to one embodiment, the camera modules 205 and 216 may include one or a plurality of lenses, an image sensor and/or an image signal processor. According to one embodiment, the first camera module 205 is disposed under the flexible display 230, and may be configured to photograph a subject for photographing through some of an activation region of the flexible display 230. According to one embodiment, the flash 218 may include a light-emitting diode or a xenon lamp, for example.

According to various embodiments, the first camera module 205 of the camera modules 205 and 216 and the first sensor module 204 of the sensor modules 204 and 217 may be disposed to detect an external environment through the flexible display 230. For example, the first camera module 205 or the first sensor module 204 may be disposed to detect an external environment through an opening or a transmission region that perforates the flexible display 230 in the internal space of the electronic device 200. According to one embodiment, a region that faces the first camera module 205 of the flexible display 230 is a part of a region in which content is displayed, and may be formed as a transmissive region having designated transmittance. According to one embodiment, the transmissive region may be formed to have transmittance in a range of about 5% to about 20%. The transmissive region may include a region through which light, formed by an image sensor and forming an image, passes and that overlaps a valid region (e.g., the view angle region) of the first camera module 205. For example, the transmissive region of the flexible display 230 may include a region having lower pixel density and/or wiring density than those in the surroundings. For example, the transmissive region may replace the aforementioned opening. For example, the first camera module 205 may include an under display camera (UDC). In another embodiment, the first sensor module 204 may be disposed to perform a corresponding function without being visually exposed through the flexible display 230, in the internal space of the electronic device 200.

According to various embodiments, the electronic device 200 may include at least one antenna configured to transmit and/or receive a radio signal in a designated at least one frequency band through at least a part of a portion that belongs to the first side member 211 of the first housing 210 and that is made of a conductive material. According to one embodiment, the first side member 211 may include a first conductive portion 261 electromagnetically fragmented through at least one non-conductive portion 2611 and 2612. According to one embodiment, the first conductive portion 261 may be electrically connected to a wireless communication circuit (e.g., the wireless communication module 192 in FIG. 1) disposed in the internal space of the electronic device 200. For example, the wireless communication circuit may be disposed in at least one of the first housing 210 or the second housing 220. According to one embodiment, the first side 2111 of the first housing 210 may include the first conductive portion 261, a first non-conductive portion 2611, or a second non-conductive portion 2612. According to one embodiment, the first conductive portion 261 may be formed through the first non-conductive portion 2611 and the second non-conductive portion 2612 disposed in the first side 2111 of the first housing 210. In an embodiment, the second non-conductive portion 2612 may be disposed at a location isolated from the first non-conductive portion 2611 at a designated distance in the second side 2112.

According to various embodiments, the second side member 221 of the second housing 220 may include a second conductive portion 268 that overlaps at least a part of the first conductive portion 261 in the slide-in state. For example, in the slide-in state, at least a part of the first conductive portion 261 may overlap the second conductive portion 268 when viewed in a −y-axis direction. According to one embodiment, the fourth side 2211 may include the second conductive portion 268 or a third non-conductive portion 2618. According to one embodiment, the second conductive portion 268 may be formed through the third non-conductive portion 2618 disposed in the fourth side 2211. According to one embodiment, in the slide-in state, radiation performance of the first conductive portion 261 used as an antenna may be deteriorated due to the second conductive portion 268 that overlaps the first conductive portion 261. Accordingly, the electronic device 200 according to various embodiments of the disclosure may include an electrical connection structure (e.g., an electrical connection structure 270 in FIG. 10) for electrically connecting the first conductive portion 261 and the second conductive portion 268 in the slide-in state. According to one embodiment, through the electrical connection of the first conductive portion 261 and the second conductive portion 268 by the electrical connection structure (e.g., the electrical connection structure 270 in FIG. 10), from a viewpoint of an antenna, the second conductive portion 268 is viewed as a part of the first conductive portion 261 used as an antenna. As a result, the deterioration of radiation performance of the antenna can be reduced. According to one embodiment, an antenna structure of the disclosure is disposed in a lower region (e.g., the region A in FIG. 2A) of the electronic device 200, but the disclosure is not limited thereto. For example, an antenna structure of the disclosure may be disposed in an upper region (e.g., the region C in FIG. 2A) of the electronic device 200 or both the lower region (region A) and the upper region (region C).

According to various embodiments, the electronic device 200 may include a plurality of other conductive portions 262, 263, 264, 265, and 266 operating as antennas through at least a part of the first side member 211. According to one embodiment, the plurality of other conductive portions 262, 263, 264, 265, and 266 may be substantially disposed in a side region (e.g., the region B in FIG. 2A) that couples the lower region (e.g., the region A in FIG. 2A) and upper region (e.g., the region C in FIG. 2A) of the electronic device 200. According to one embodiment, the plurality of other conductive portions 262, 263, 264, 265, and 266 may include a third conductive portion 262 disposed through the second non-conductive portion 2612 formed in the first side 2111 and a fourth non-conductive portion 2613 formed in the second side 2112, a fourth conductive portion 263 disposed through the fourth non-conductive portion 2613 and a fifth non-conductive portion 2614, a fifth conductive portion 264 disposed through the fifth non-conductive portion 2614 and a sixth non-conductive portion 2615, a sixth conductive portion 265 disposed through the sixth non-conductive portion 2615 and a seventh non-conductive portion 2616 and/or a seventh conductive portion 266 disposed through the seventh non-conductive portion 2616 and an eighth non-conductive portion 2617 formed in the third side 2113. The plurality of other conductive portions 262, 263, 264, 265, and 266 according to one embodiment may also be used as the radiators of antennas operating in various frequency bands.

Figure 4A:
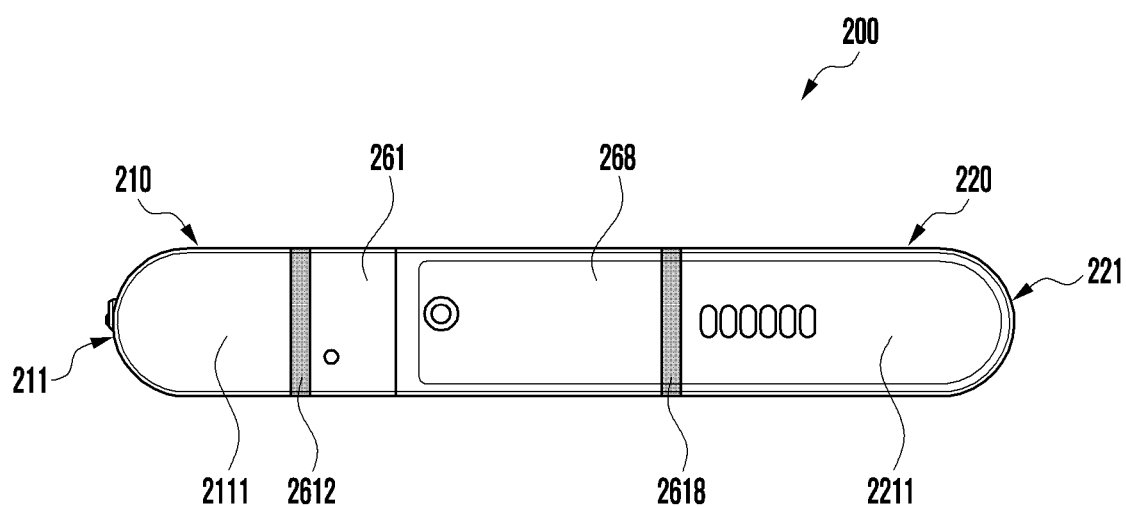
FIGS. 4A and 4B are diagrams illustrating a side of an electronic device in the slide-in state and the slide-out state according to various embodiments of the disclosure.
Figure 4B:
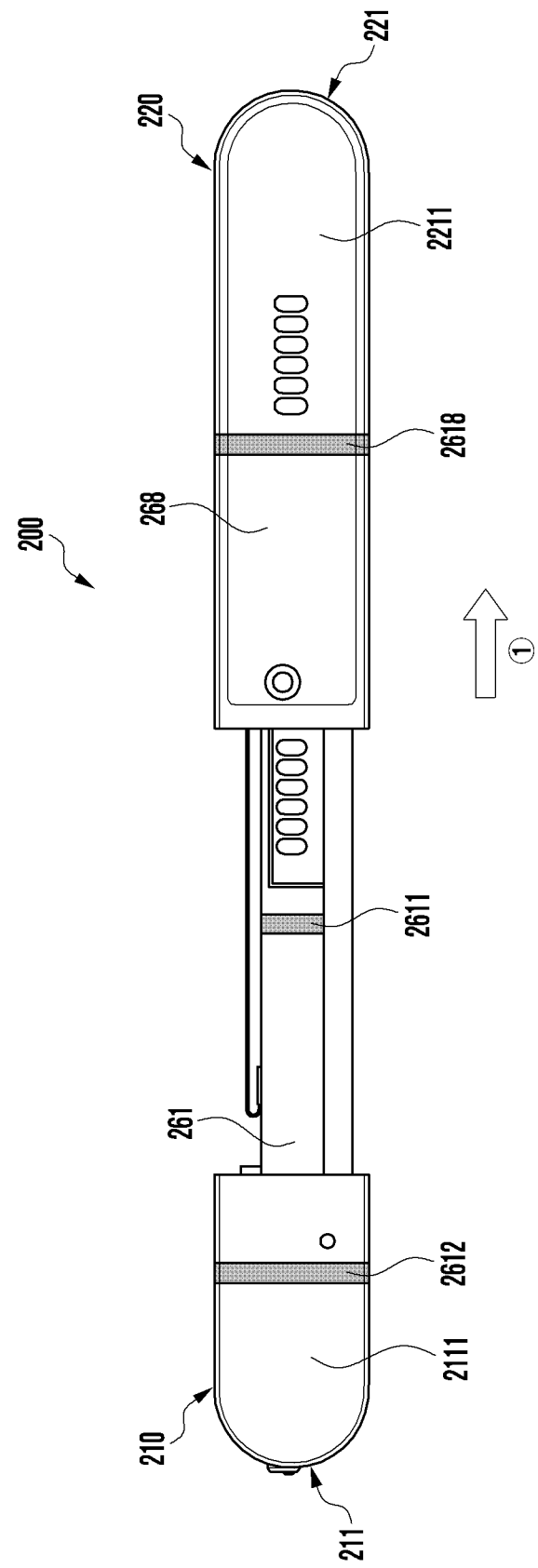

FIGS. 4A and 4B are diagrams illustrating a side of an electronic device in a slide-in state and a slide-out state according to various embodiments of the disclosure.

Referring to FIGS. 4A and 4B, the electronic device 200 may include the first housing 210 and the second housing 220 slidably disposed at a designated round-trip distance from at least a part of the first housing 210. According to one embodiment, the first housing 210 may include the first side member 211 disposed to at least partially surround the first space (e.g., the first space 2101 in FIG. 6A) of the first housing 210. For example, the first side member 211 may include a conductive material. According to one embodiment, the second housing 220 may include the second side member 221 disposed to at least partially surround the second space (e.g., the second space 2201 in FIG. 6A) of the second housing 220. For example, the second side member 221 may include a conductive material. According to one embodiment, the electronic device 200 may operate through a coupling structure in which the first side member 211 of the first housing 210 and the second side member 221 of the second housing 220 are slidable with respect to each other. For example, in the slide-in state, at least a part of the first side 2111 in the first side member 211 of the first housing 210 may slide into the second space (e.g., the second space 2201 in FIG. 6A), while facing (overlapping) the fourth side 2211 of the second side member 221 of the second housing 220. According to one embodiment, in the slide-out state, a part of the first side 2111 that has slid into the second space (e.g., the second space 2201 in FIG. 6A) may slide out from the second space (e.g., the second space 2201 in FIG. 6A) in response to an operation of the second housing 220 sliding in the designated first direction (direction ①).

According to various embodiments, the electronic device 200 may include the first conductive portion 261 formed through the first non-conductive portion 2611 and the second non-conductive portion 2612 disposed in the first side 2111 of the first housing 210. According to one embodiment, the electronic device 200 may include the second conductive portion 268 formed through the third non-conductive portion 2618 disposed in the fourth side 2211 of the second housing 220. According to one embodiment, in the slide-in state, radiation performance of the first conductive portion 261 used as an antenna may be deteriorated due to the second conductive portion 268 that overlaps the first conductive portion 261. Accordingly, the electronic device 200 according to various embodiments of the disclosure may include an electrical connection structure (e.g., the electrical connection structure 270 in FIG. 10) for electrically connecting the first conductive portion 261 and the second conductive portion 268 in the slide-in state.

Figure 5:
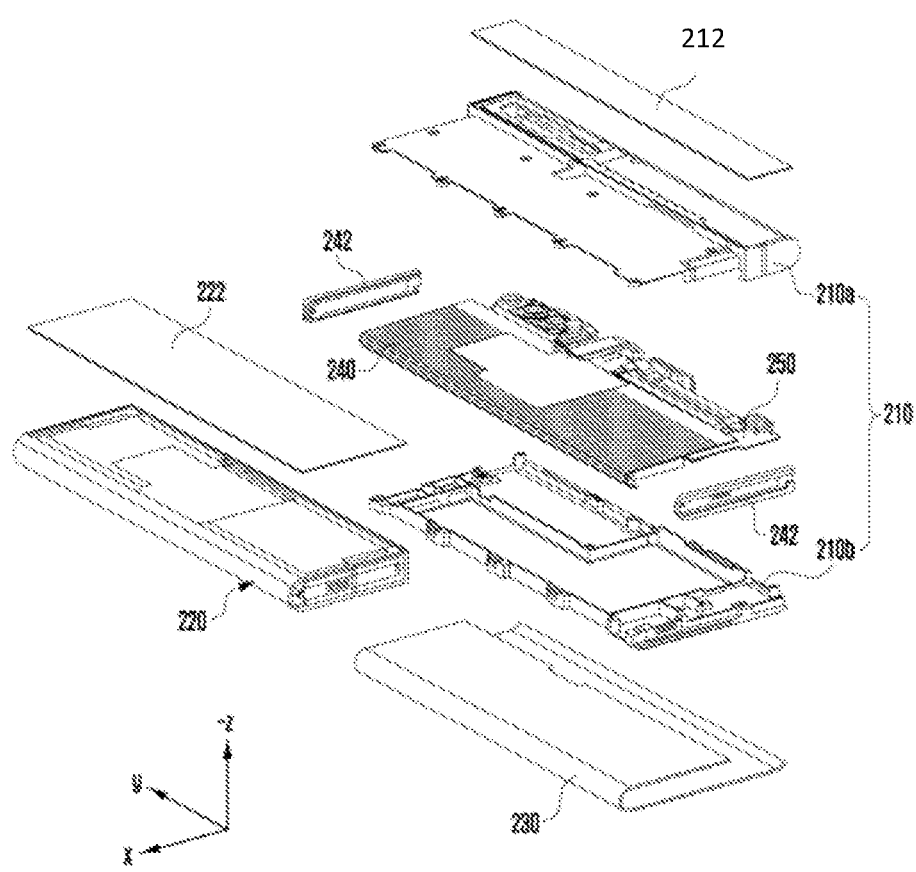
FIG. 5 is a separated perspective view of the electronic device according to an embodiment of the disclosure.

FIG. 5 is a separated perspective view of an electronic device according to an embodiment of the disclosure.

Referring to FIG. 5, the electronic device 200 may include the first housing 210 including the first space (e.g., the first space 2101 in FIG. 6A), the second housing 220 slidably coupled to the first housing 210 and including the second space (e.g., the second space 2201 in FIG. 6A), the bendable member 240 rotatably disposed in the second space (e.g., the second space 2201 in FIG. 6A) and/or the flexible display 230 disposed to be supported by the bendable member 240 and the first housing 210. According to one embodiment, the first space (e.g., the first space 2101 in FIG. 6A) of the first housing 210 may be formed by the coupling of a first bracket housing 210a and a second bracket housing 210b. According to one embodiment, the electronic device 200 may include a substrate 250 disposed in the first space (e.g., the first space 2101 in FIG. 6A). According to one embodiment, the electronic device 200 may include a camera module (e.g., the camera module 216 in FIG. 3A) or a sensor module (e.g., the sensor module 217 in FIG. 3A) disposed in the first space (e.g., the first space 2101 in FIG. 6A). For example, the camera module (e.g., the camera module 216 in FIG. 3A) or the sensor module (e.g., the sensor module 217 in FIG. 3A) may be disposed in or electrically connected to the substrate 250. According to one embodiment, the bendable member 240 may be disposed to have one end fixed to the first housing 210 and the other end rotatably received in the second space (e.g., the second space 2201 in FIG. 6A) of the second housing 220. For example, the bendable member 240 may be at least partially received in the second space (e.g., the second space 2201 in FIG. 6A) in the slide-in state, and may slide out from the second space (e.g., the second space 2201 in FIG. 6A) in a way to form substantially the same plane along with at least a part of the first housing 210 in the slide-out state. For example, a display area of the flexible display 230 supported by the first housing 210 and the bendable member 240 may vary depending on a sliding operation.

According to various embodiments, the electronic device 200 may include the first back cover 212 disposed in the first housing 210 and the second back cover 222 disposed in the second housing 220. According to one embodiment, the electronic device 200 may further include a guide rail 242 disposed on the side of the first bracket housing 210a and the second bracket housing 210b coupled together and guided into the internal space (e.g., the second space 2201 in FIG. 6A) of the second housing 220.

Figure 6A:
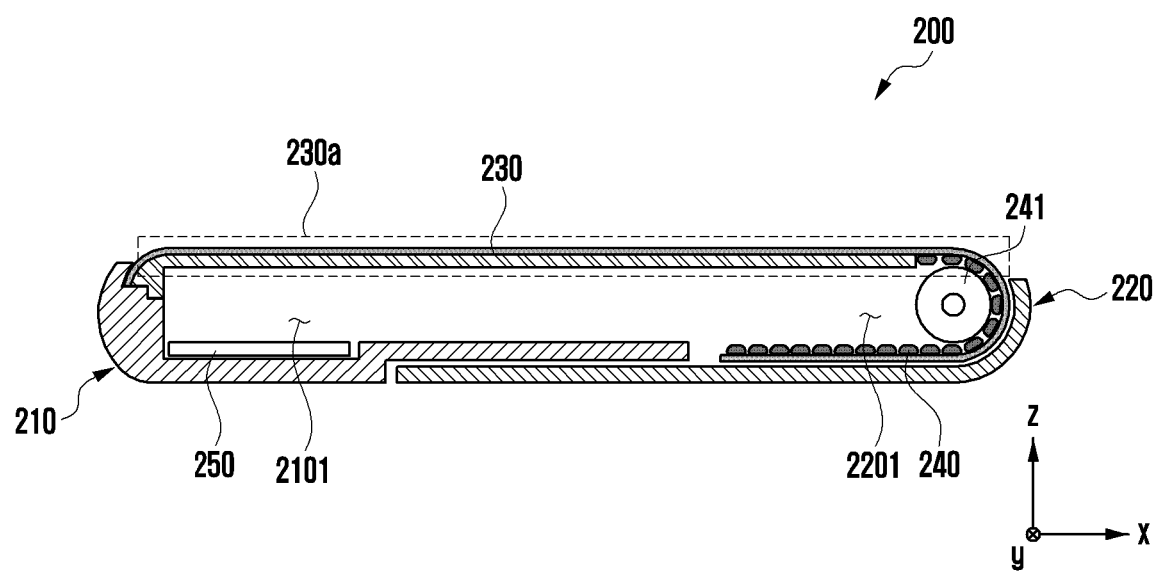
FIG. 6A is a cross-sectional view of the electronic device, which is viewed along line 4a-4a of FIG. 2A, according to an embodiment of the disclosure.

FIG. 6A is a cross-sectional view of an electronic device, which is viewed along line 4a-4a of FIG. 2A, according to an embodiment of the disclosure.

Figure 6B:
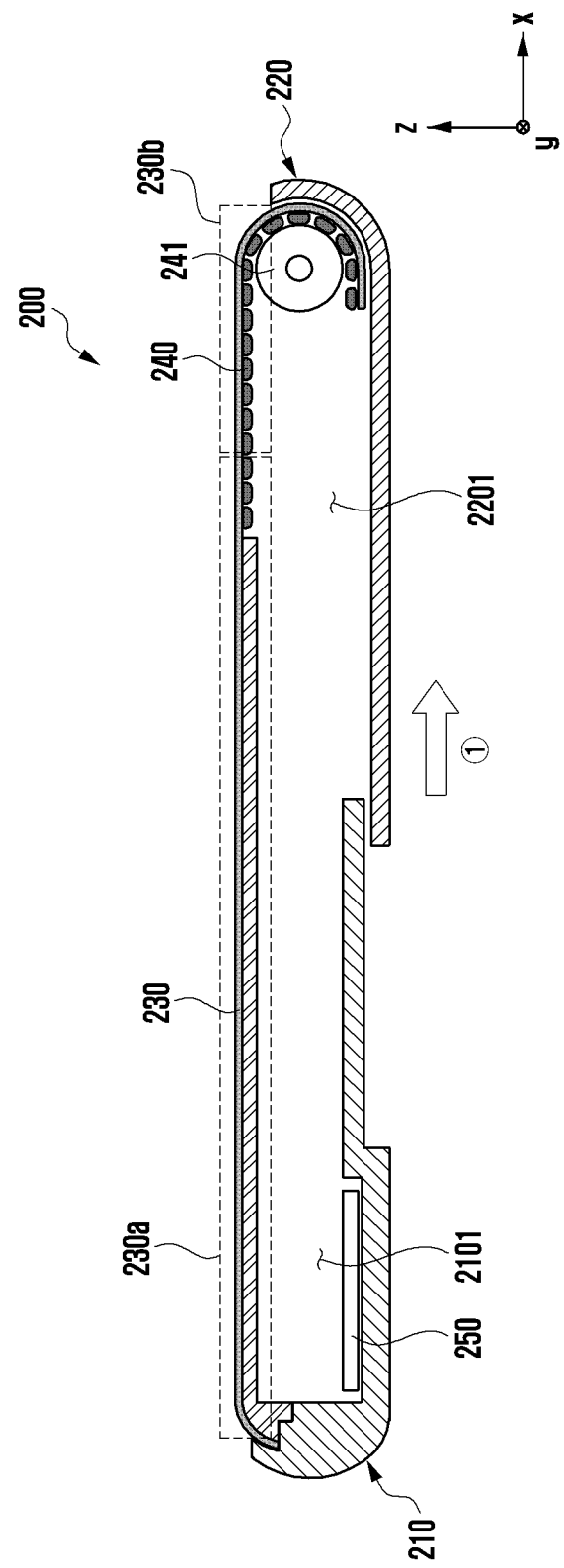
FIG. 6B is a cross-sectional view of the electronic device, which is viewed along line 4b-4b of FIG. 2B, according to an embodiment of the disclosure.

FIG. 6B is a cross-sectional view of an electronic device, which is viewed along line 4b-4b of FIG. 2B, according to an embodiment of the disclosure.

Referring to FIGS. 6A and 6B, the electronic device 200 may include the first housing 210 including the first space 2101, the second housing 220 including the second space 2201 and slidably disposed in the designated first direction (direction ①) from the first housing 210, and the flexible display 230 disposed to be supported by at least a part of the first housing 210 and the second housing 220. According to one embodiment, the second housing 220 may include a support roller 241 rotatably disposed in the second space 2201 and the bendable member 240 (e.g., a multi-bar assembly) operating while being supported by the support roller 241. According to one embodiment, the bendable member 240 may be disposed to be coupled to at least a part of the first housing 210, and may at least partially slide in or slide out the second space 2201 while being supported by the support roller 241 in accordance with a sliding operation of the second housing 220. For example, in the slide-out state, at least a part of the bendable member 240 may slide out to the outside in a way to substantially form the same plane along with at least a part of the first housing 210, thus supporting the flexible display 230. According to one embodiment, in the slide-in state, the bendable member 240 may support an extended region (e.g., the second region 230b in FIG. 2B) of the flexible display 230 so that the extended region is received in the second space 2201 of the second housing 220 in a way to be invisible to the outside. According to one embodiment, in the slide-in state, a part of the bendable member 240 may be disposed to support a part of the first region 230a of the flexible display 230. According to one embodiment, in the slide-out state, a part of the bendable member 240 may be disposed to support a part of the first region 230a of the flexible display 230 and the second region 230b thereof. According to one embodiment, in the slide-out state, a part of the bendable member 240 may be disposed to support a part of the flexible display 230, maintained within the second housing 220, in a way to be invisible to the outside. In an embodiment, at least a part of the bendable member 240 may be disposed in the first housing 210. In such a case, at least a part of the flexible display 230 may be received in the first space 2101 of the first housing 210 in the slide-in state.

Figure 7:
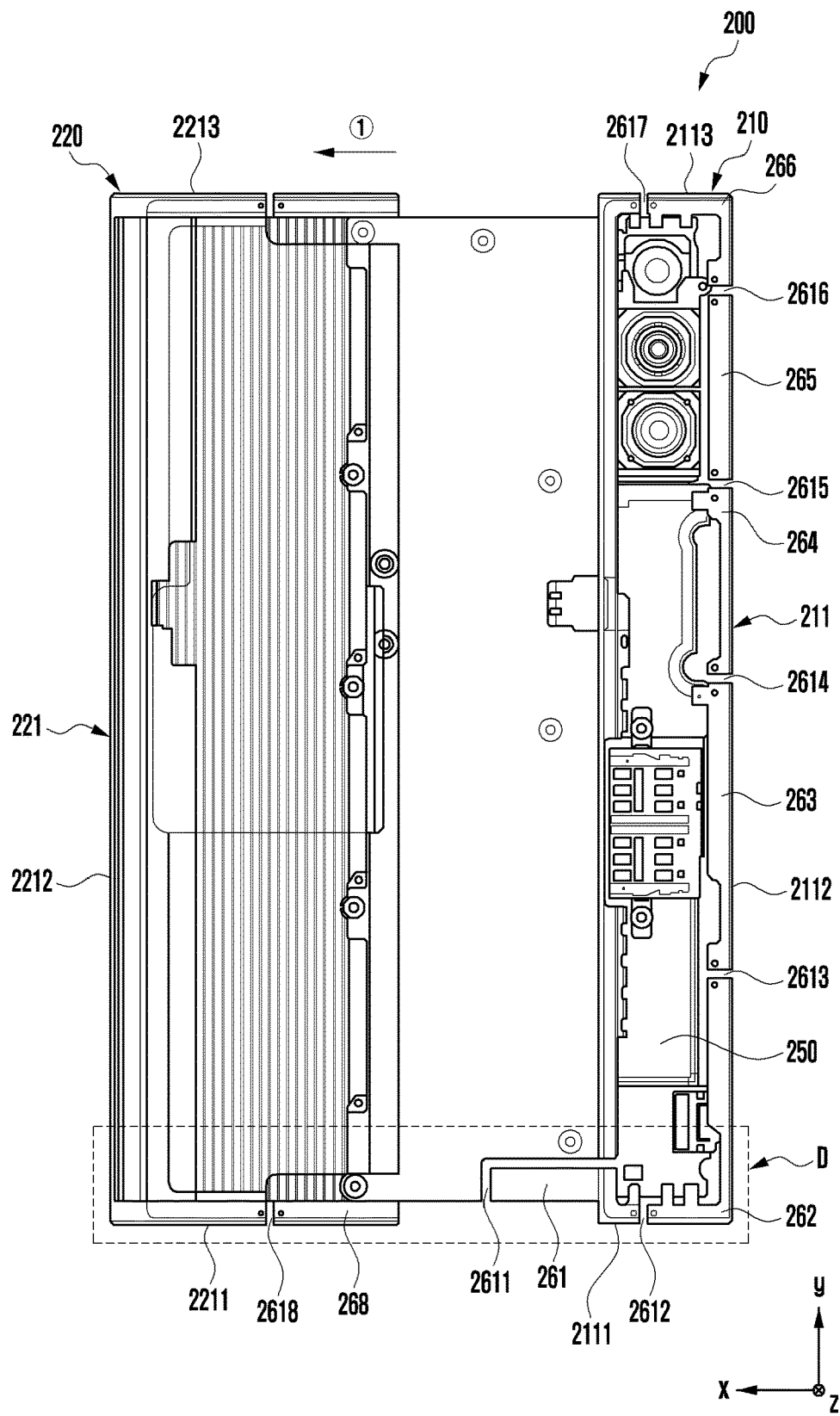
FIG. 7 is a diagram illustrating a back of an electronic device from which back covers have been moved in a slide-out state according to an embodiment of the disclosure.

FIG. 7 is a diagram illustrating the back of the electronic device from which back covers have been moved in the slide-out state according to an embodiment of the disclosure.

FIG. 7 illustrates the state in which the second housing has slid out from the first housing in a designated first direction.

Referring to FIG. 7, the electronic device 200 may include the first housing 210, and the second housing 220 slidably coupled to the first housing 210 at a designated round-trip distance. According to one embodiment, the first housing 210 may include the first side member 211 made of a conductive material. According to one embodiment, the first side member 211 may include the first conductive portion 261 electromagnetically fragmented through at least one non-conductive portion 2611 and 2612. In one embodiment, the non-conductive portion 2611 and 2612 may be filled with a dielectric substance. According to one embodiment, the first conductive portion 261 may operate as an antenna by being electrically connected to a wireless communication circuit (e.g., the wireless communication module 192 in FIG. 1) disposed in the substrate 250. According to one embodiment, the wireless communication circuit (e.g., the wireless communication module 192 in FIG. 1) may be configured to transmit and/or receive a radio signal in at least one frequency band of a low band (e.g., about 700 MHz to 900 MHz), a mid-band (about 1700 MHz to 2100 MHz), a high band (about 2300 MHz to 2700 MHz) or a sub-6 band (about 3 GHz to 6 GHz) through the first conductive portion 261. However, an operating frequency band may not be limited to the above example.

According to various embodiments, the second housing 220 may include the second side member 221 made of a conductive material. According to one embodiment, the second side member 221 may include the second conductive portion 268 overlapping at least a part of the first conductive portion 261 in the slide-in state. According to one embodiment, the second conductive portion 268 may be fragmented through the third non-conductive portion 2618 disposed in the fourth side 2211.

According to various embodiments, the electronic device 200 may include the plurality of other conductive portions 262, 263, 264, 265, and 266 operating as antennas through the conductive first side member 211. According to one embodiment, the plurality of other conductive portions 262, 263, 264, 265, and 266 may include the third conductive portion 262 disposed through the second non-conductive portion 2612 formed in the first side 2111 and the fourth non-conductive portion 2613 formed in the second side 2112, the fourth conductive portion 263 disposed through the fourth non-conductive portion 2613 and the fifth non-conductive portion 2614, the fifth conductive portion 264 disposed through the fifth non-conductive portion 2614 and the sixth non-conductive portion 2615, the sixth conductive portion 265 disposed through the sixth non-conductive portion 2615 and the seventh non-conductive portion 2616 and/or the seventh conductive portion 266 disposed through the seventh non-conductive portion 2616 and the eighth non-conductive portion 2617 formed in the third side 2113. The plurality of other conductive portions 262, 263, 264, 265, and 266 according to one embodiment may also be configured to operate in the aforementioned various frequency bands.

According to various embodiments, in the slide-in state, radiation performance of the first conductive portion 261 used as an antenna may be deteriorated due to the second conductive portion 268 that overlaps the first conductive portion 261. Accordingly, the electronic device 200 according to various embodiments of the disclosure may include an electrical connection structure (e.g., the electrical connection structure 270 in FIG. 10) for electrically connecting the first conductive portion 261 and the second conductive portion 268 in the slide-in state. According to one embodiment, through the electrical connection of the first conductive portion 261 and the second conductive portion 268 by the electrical connection structure (e.g., the electrical connection structure 270 in FIG. 10), from a viewpoint of an antenna, the second conductive portion 268 is viewed as a part of the first conductive portion 261 used as an antenna. As a result, the deterioration of radiation performance of the antenna can be reduced.

Figure 8A:
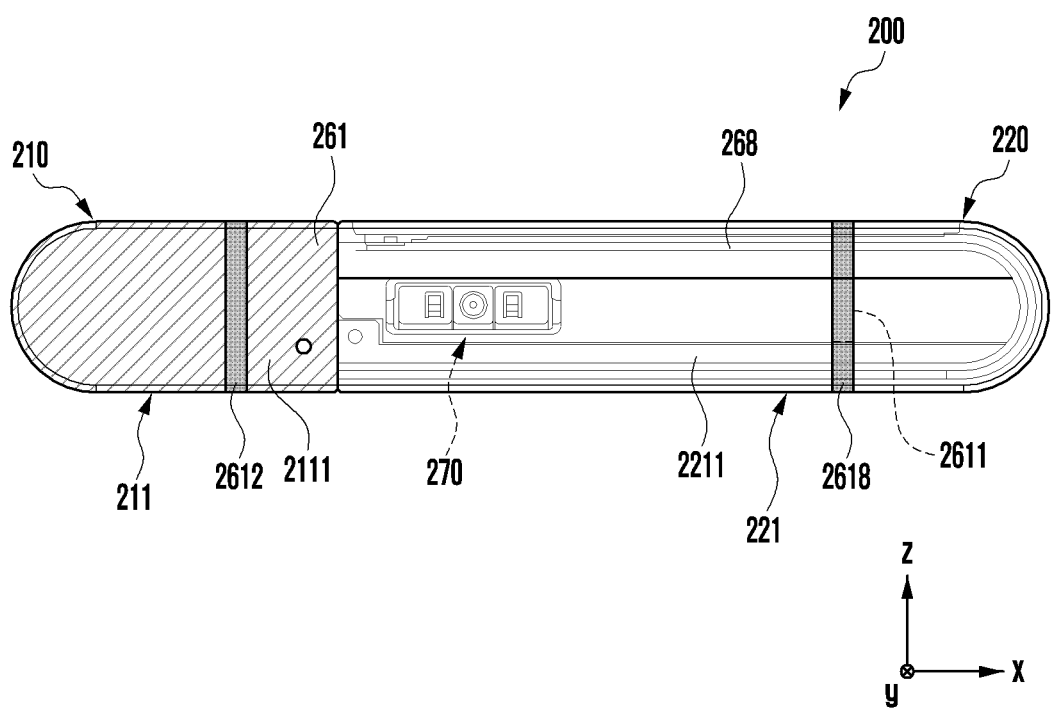
FIGS. 8A and 8B are a lateral view and some plan view illustrating a deployment relation between a first conductive portion of a first housing and a second conductive portion of a second housing in a slide-in state according to various embodiments of the disclosure.
Figure 8B:
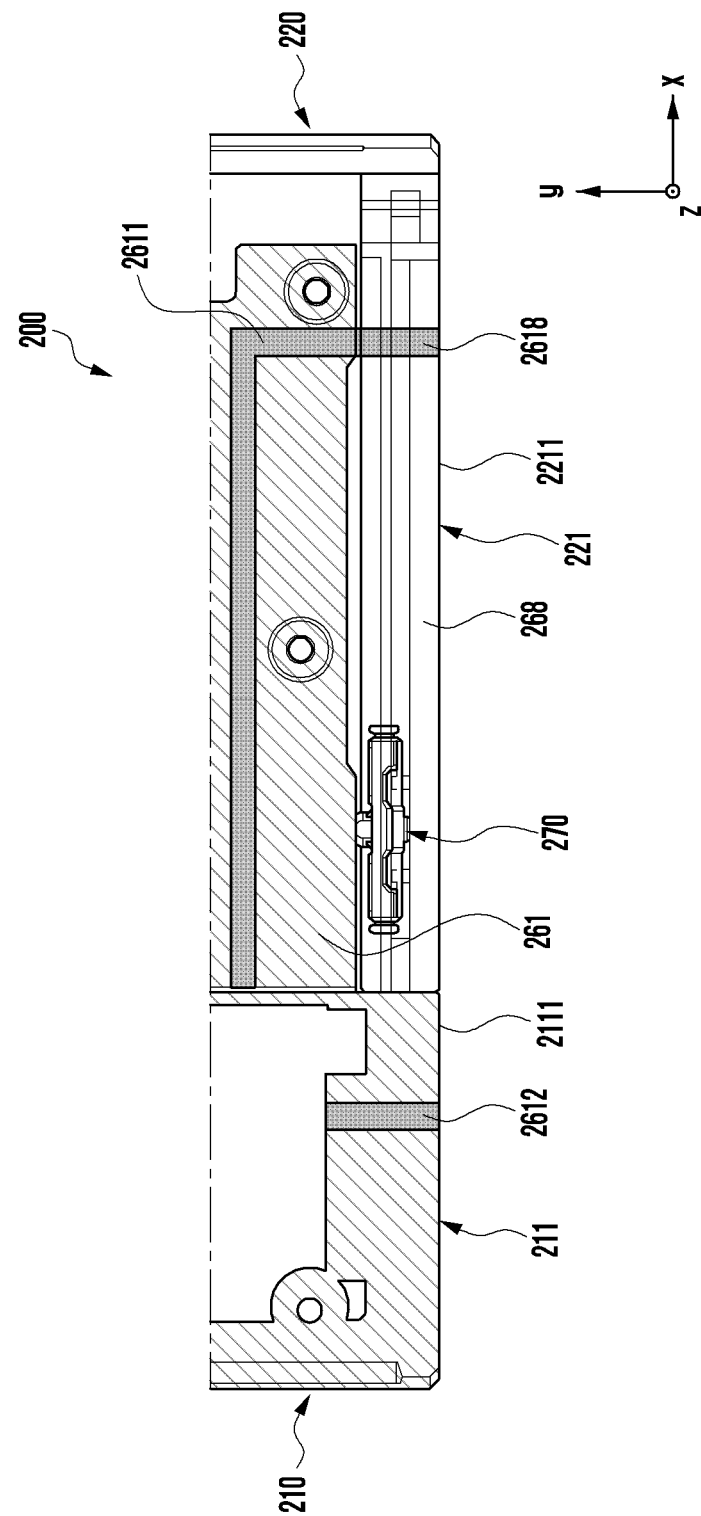

FIGS. 8A and 8B are a lateral view and some plan view illustrating a deployment relation between a first conductive portion of a first housing and a second conductive portion of a second housing in a slide-in state according to various embodiments of the disclosure. FIG. 8B is a plan view illustrating a region D of the electronic device 200 in FIG. 7.

Referring to FIGS. 8A and 8B, the electronic device 200 may include the first conductive portion 261 fragmented through a first non-conductive portion (e.g., the first non-conductive portion 2611 in FIG. 7) and the second non-conductive portion 2612, spaced apart from each other at a designated interval, in the first side 2111 of the first side member 211. According to one embodiment, the electronic device 200 may include the second conductive portion 268 fragmented through the third non-conductive portion 2618 disposed in the fourth side 2211 of the second side member 221. In one embodiment, the first side member 211 may include a conductive member (e.g., metal). According to one embodiment, the non-conductive portions 2611, 2612, and 2618 may have a dielectric substance of a polymer material filled through dual injection or insert injection.

According to various embodiments, in the slide-in state, the electronic device 200 may be configured so that the first side 2111 of the first side member 211 of the first housing 210 is disposed at a location that partially faces the fourth side 2211 of the second side member 221 of the second housing 220. For example, radiation performance of the first conductive portion 261 disposed in the first side 2111 may be deteriorated because a part of or the entire first conductive portion 261 is disposed to overlap the second conductive portion 268. In such a case, according to one embodiment, the first conductive portion 261 and the second conductive portion 268 may be electrically connected through the electrical connection structure 270 disposed between the first side 2111 and the fourth side 2211. According to one embodiment, the electrical connection structure 270 may include a contact portion (e.g., a first contact protrusion 2711 in FIG. 10) which may be disposed in the second housing 220 and physically comes into contact with the first side member 211 in the slide-in state. According to one embodiment, the first non-conductive portion 2611 may be disposed at a location invisible to the outside by being covered with the fourth side 2211 in the slide-in state. In such a case, the third non-conductive portion 2618 may be disposed at a location that faces the first non-conductive portion 2611 in the slide-in state. For example, when the first side 2111 is viewed from the outside, the third non-conductive portion 2618 may be disposed at a location overlapping the first non-conductive portion 2611 in the slide-in state. In this case, in the slide-in state, when the first conductive portion 261 operates as an antenna, a matching circuit (not illustrated) capable of compensating for an electrical length changed by the second conductive portion 268 electrically connected to the first conductive portion 261 is added so that the antenna has substantially the same electrical length. Accordingly, an unwanted frequency shift or the deterioration of radiation performance attributable to the second conductive portion 268 can be prevented. For example, the matching circuit may include a capacitor, an inductor or a switch.

In the slide-in state of the electronic device 200, when the first conductive portion 261 and the second conductive portion 268 are not electrically connected, a flow of a surface current formed in the first conductive portion 261 and the second conductive portion 268 may be formed in an offset direction with respect to each other. However, according to an embodiment of the disclosure, when the first conductive portion 261 and the second conductive portion 268 are electrically connected through the electrical connection structure 270, the deterioration of radiation performance of an antenna can be prevented or reduced due to an increased surface current because a flow of a surface current flows in the same direction.

Figure 9A:
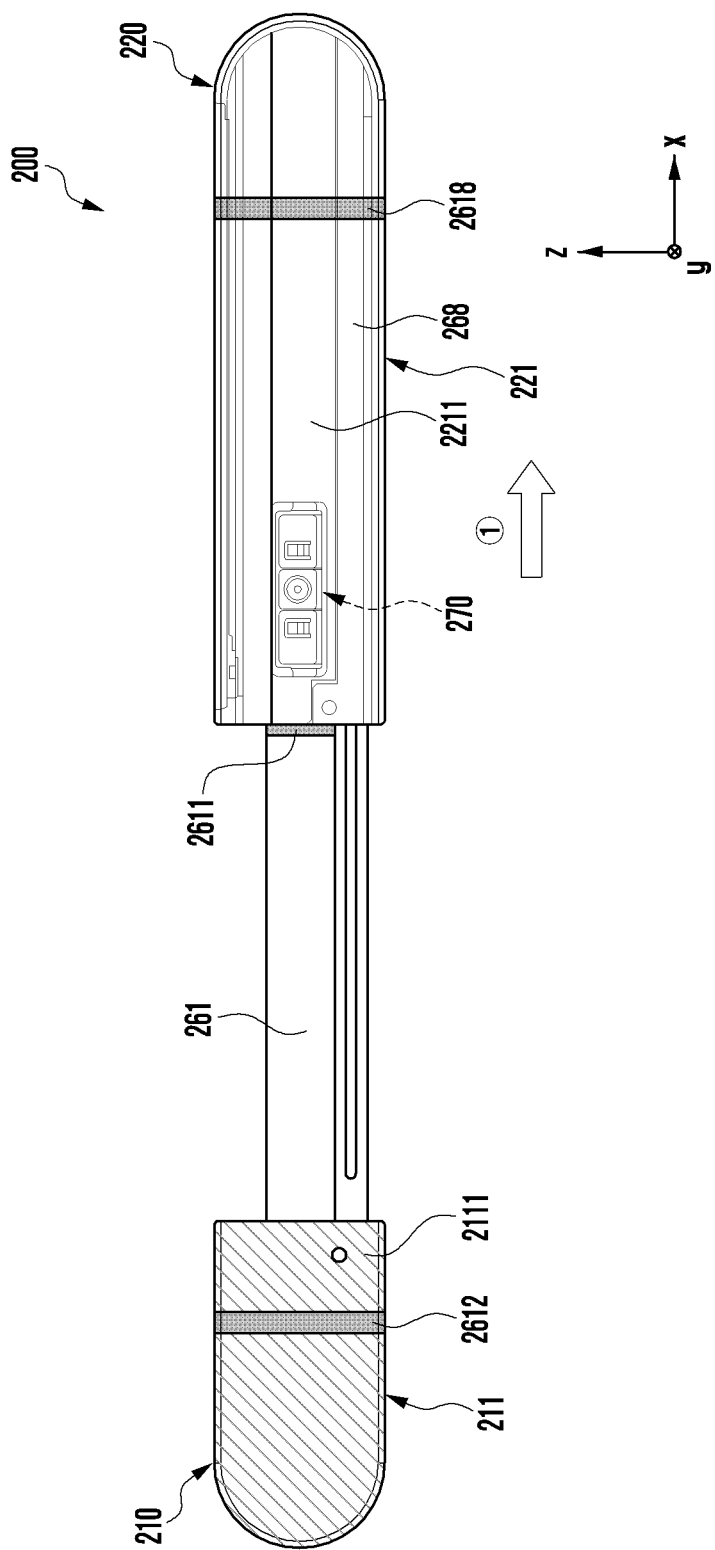
FIGS. 9A and 9B are a lateral view and some plan view illustrating a deployment relation between a first conductive portion of a first housing and a second conductive portion of a second housing in a slide-out state according to various embodiments of the disclosure.
Figure 9B:
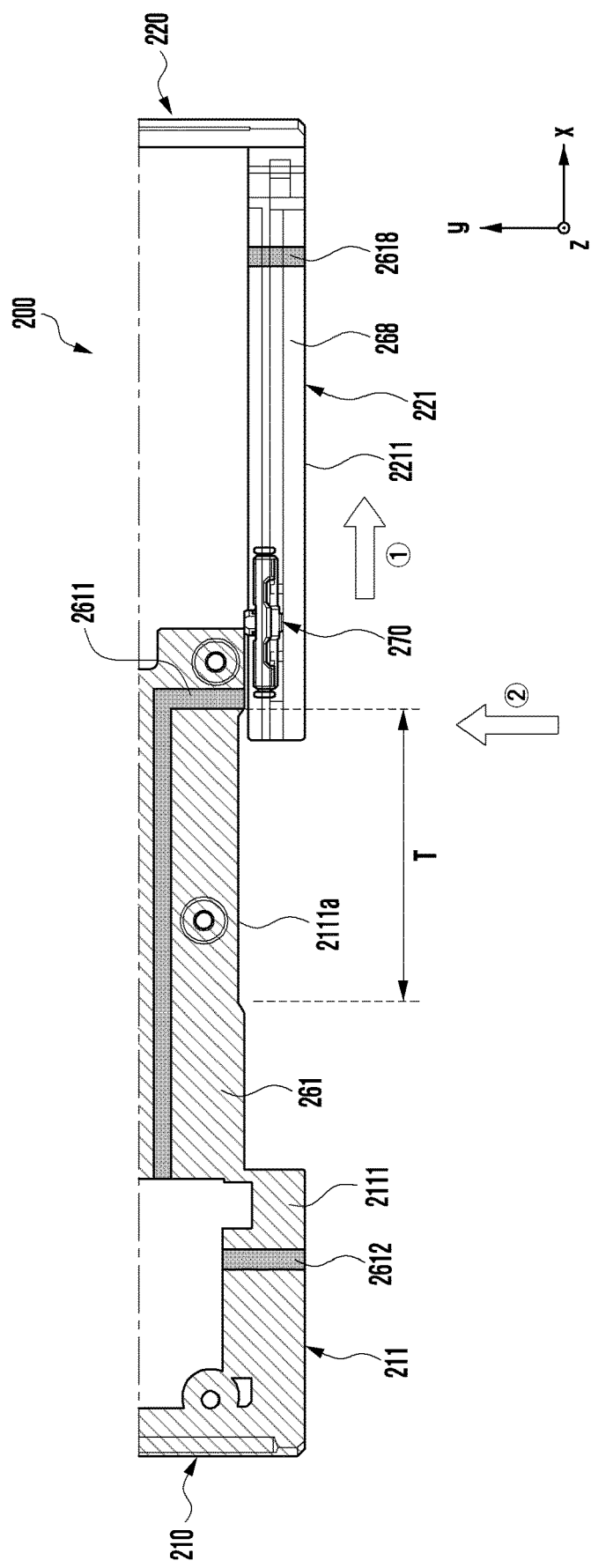

FIGS. 9A and 9B are a lateral view and some plan view illustrating a deployment relation between a first conductive portion of a first housing and a second conductive portion of a second housing in a slide-out state according to various embodiments of the disclosure.

Referring to FIGS. 9A and 9B, when the second housing 220 of the electronic device 200 slides out in a designated first direction (direction ①), the first conductive portion 261 may be exposed in a way to be visible to the outside. In such a case, the state in which the first conductive portion 261 is electrically disconnected from the second conductive portion 268 can be maintained because the electrical connection structure 270 deviates from the first conductive portion 261 of the first side 2111. Accordingly, only the first conductive portion 261 may substantially operate as an antenna radiator.

According to various embodiments, the electronic device 200 may include an electrical disconnection section T disposed in the first conductive portion 261 of the first side 2111. According to one embodiment, the electrical disconnection section T may mean a section in which the second conductive portion 268 through the electrical connection structure 270 is not electrically connected to the first conductive portion 261 when the second housing 220 is in an intermediate state between the slide-out state and the slide-in state. According to one embodiment, the electrical disconnection section T may be formed to have a designated length in a direction from the first non-conductive portion 2611, disposed in the first side 2111, to the second non-conductive portion 2612. In an embodiment, the electrical disconnection section T may be additionally extended from the first non-conductive portion 2611 to a direction opposite to the second non-conductive portion 2612 in the first side 2111. In such a case, friction resistance between the electrical connection structure 270 and the first side 2111 can be reduced upon shift to the slide-in state because the first side 2111 does not come into contact with the electrical connection structure 270 in the slide-out state. According to one embodiment, the electrical connection structure 270 is not electrically connected and does not come into contact with the first conductive portion 261 through the electrical disconnection section T, within a range in which radiation performance of a designated antenna through the first conductive portion 261 is maintained. Accordingly, a feeling of smooth sliding can be provided to a user by reducing a friction force between the electrical connection structure 270 and the first side 2111. For example, when the second housing 220 slides in or slides out, although the second conductive portion 268 is not electrically connected to the first conductive portion 261 during a designated sliding section (e.g., the electrical disconnection section T), radiation performance of the first conductive portion 261 may not be substantially deteriorated. According to one embodiment, the electrical disconnection section T may be formed through a recess 2111a that is lower than an outer surface of the first conductive portion 261 by a designated depth in a sliding direction (direction ①), in the first conductive portion 261.

Figure 9C:
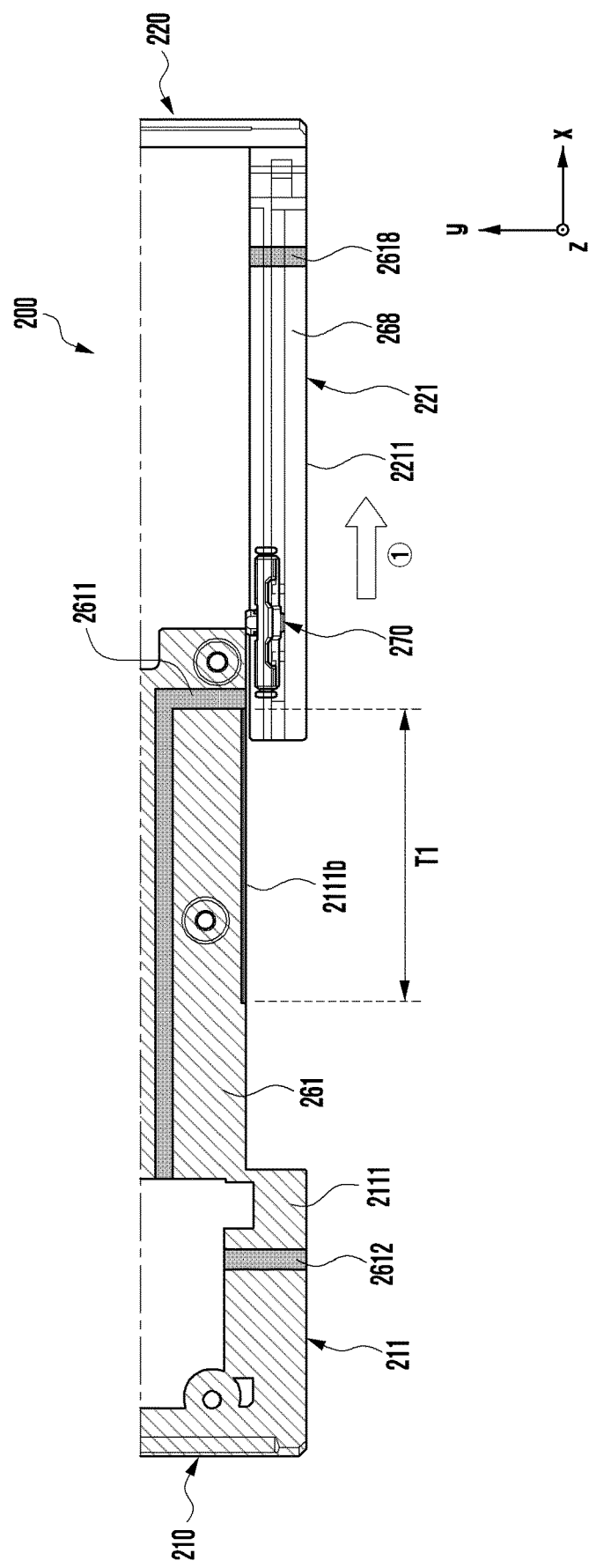
FIG. 9C is a partial cross-sectional view of the electronic device including an electrical disconnection section according to an embodiment of the disclosure.

FIG. 9C is a part cross-sectional view of the electronic device including the electrical disconnection section according to an embodiment of the disclosure.

Referring to FIG. 9C, in order to provide a feeling of smooth sliding during a slide-in and/or slide-out operation of the second housing 220, an electrical disconnection section T1 may include a non-conductive coating region 2111b formed in an outer surface of the first side 2111. For example, the first conductive portion 261 may be electrically separated from the electrical connection structure 270 by the non-conductive coating region 2111b in the electrical disconnection section T1. According to one embodiment, the non-conductive coating region 2111b may include a Teflon coating layer and/or a hard coating layer in order to reduce a frictional force with the outer surface of the first side 2111. According to various embodiments, the recess 2111a or the non-conductive coating region 2111b may be omitted. For example, the electrical connection structure 270 may always physically come into contact with or may always be electrically connected to the first side 2111.

Figure 10:
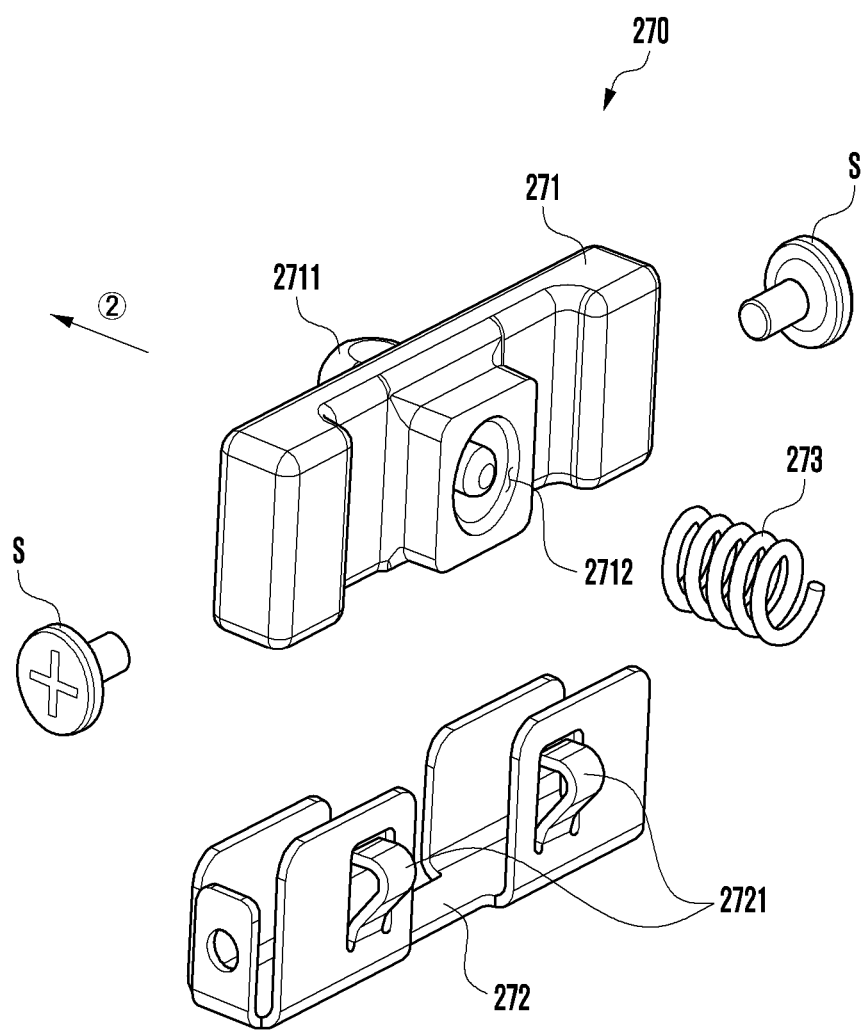
FIG. 10 is a diagram illustrating an electrical connection structure according to an embodiment of the disclosure.

FIG. 10 is a diagram illustrating an electrical connection structure according to an embodiment of the disclosure.

Referring to FIG. 10, an electronic device (e.g., the electronic device 200 in FIG. 9B) may include the electrical connection structure 270 disposed in the second housing (e.g., the second housing 220 in FIG. 9B). According to one embodiment, the electrical connection structure 270 may include a conductive contact body 271 disposed in a way to be movable substantially in parallel to a direction (direction ②) toward the first side (e.g., the first side 2111 in FIG. 8B) in the second side (e.g., the fourth side 2211 in FIG. 8B) and configured to selectively come into contact with the first side 2111 or a conductive contact frame 272 coupled to the conductive contact body 271 and configured to selectively come into contact with the second side (e.g., the fourth side 2211). According to one embodiment, the conductive contact body 271 may include the first contact protrusion 2711 selectively coming into contact with the first side 2111. According to one embodiment, the conductive contact frame 272 may include a second contact protrusion 2721 selectively coming into contact with the fourth side 2211. According to one embodiment, the first contact protrusion 2711 may be integrated and formed with the conductive contact body 271. According to one embodiment, at least one second contact protrusion 2721 may be integrated and formed with the conductive contact frame 272. For example, two second contact protrusions 2721 are illustrated in the drawing, but the number of second contact protrusions 2721 may be one or more. According to one embodiment, the electrical connection structure 270 may further include a resilient member 273 disposed between the conductive contact body 271 and the fourth side 2211 and configured to pressurize the conductive contact body 271 in the direction (direction ②) toward the first side. According to one embodiment, the resilient member 273 may be made of a non-conductive material in order to electrically disconnect the first conductive portion 261 and the second conductive portion 268 in the electrical disconnection section T because the resilient member 273 comes into contact with the fourth side 2211 and the conductive contact body 271. In an embodiment, the electrical connection structure 270 may further include a non-conductive structure disposed between the resilient member 273 and the conductive contact body 271. According to one embodiment, the resilient member 273 may include a compression coil spring supported by the fourth side 2211 and configured to pressurize the conductive contact body 271 in the direction toward the first side 2111. In an embodiment, the electrical connection structure 270 may be composed of only the conductive contact body 271 in which the first contact protrusion 2711 and the second contact protrusion 2721 are disposed in opposite directions. According to one embodiment, the electrical connection structure 270 may include a coupling member S (e.g., a screw) for coupling the conductive contact body 271 and the conductive contact frame 272. The coupling member S may include another member (e.g., a pin) for fixing or may be substituted with adhesives or a tape, for example. According to one embodiment, if the conductive contact body 271 and the conductive contact frame 272 are coupled through the coupling member, they can be electrically connected. Furthermore, for example, the electrical connection structure 270 may be formed to have a structure, which may be always electrically connected to the fourth side 2211 and may be selectively connected to the first side 2111.

Figure 11A:
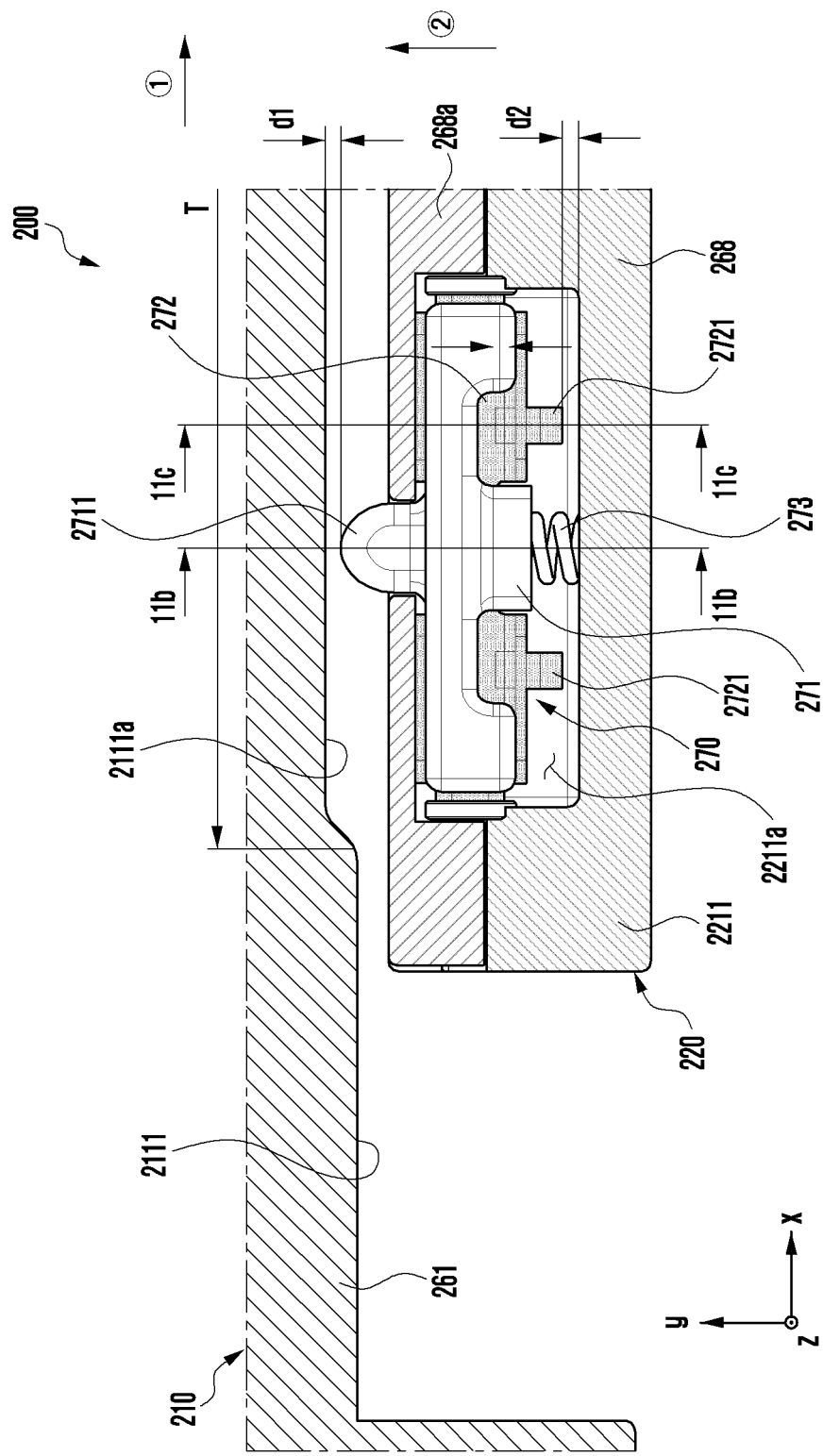
FIG. 11A is a diagram illustrating a location where an electrical connection structure is positioned in an intermediate state according to an embodiment of the disclosure.

FIG. 11A is a diagram illustrating a location where an electrical connection structure is positioned in an intermediate state according to an embodiment of the disclosure.

Figure 11B:
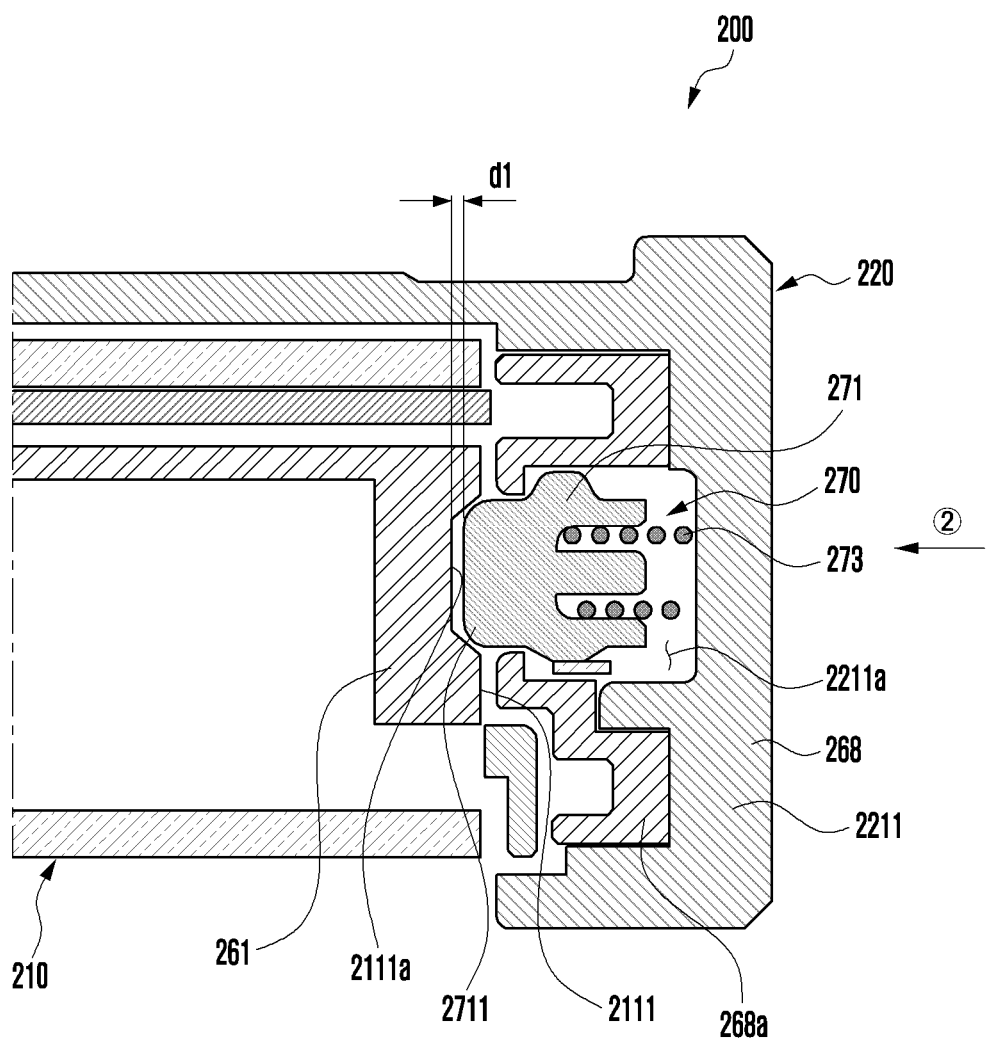
FIG. 11B is a partial cross-sectional view of an electronic device, which is viewed along line 11b-11b of FIG. 11A, according to an embodiment of the disclosure.

FIG. 11B is a part cross-sectional view of an electronic device, which is viewed along line 11b-11b of FIG. 11A, according to an embodiment of the disclosure.

Figure 11C:
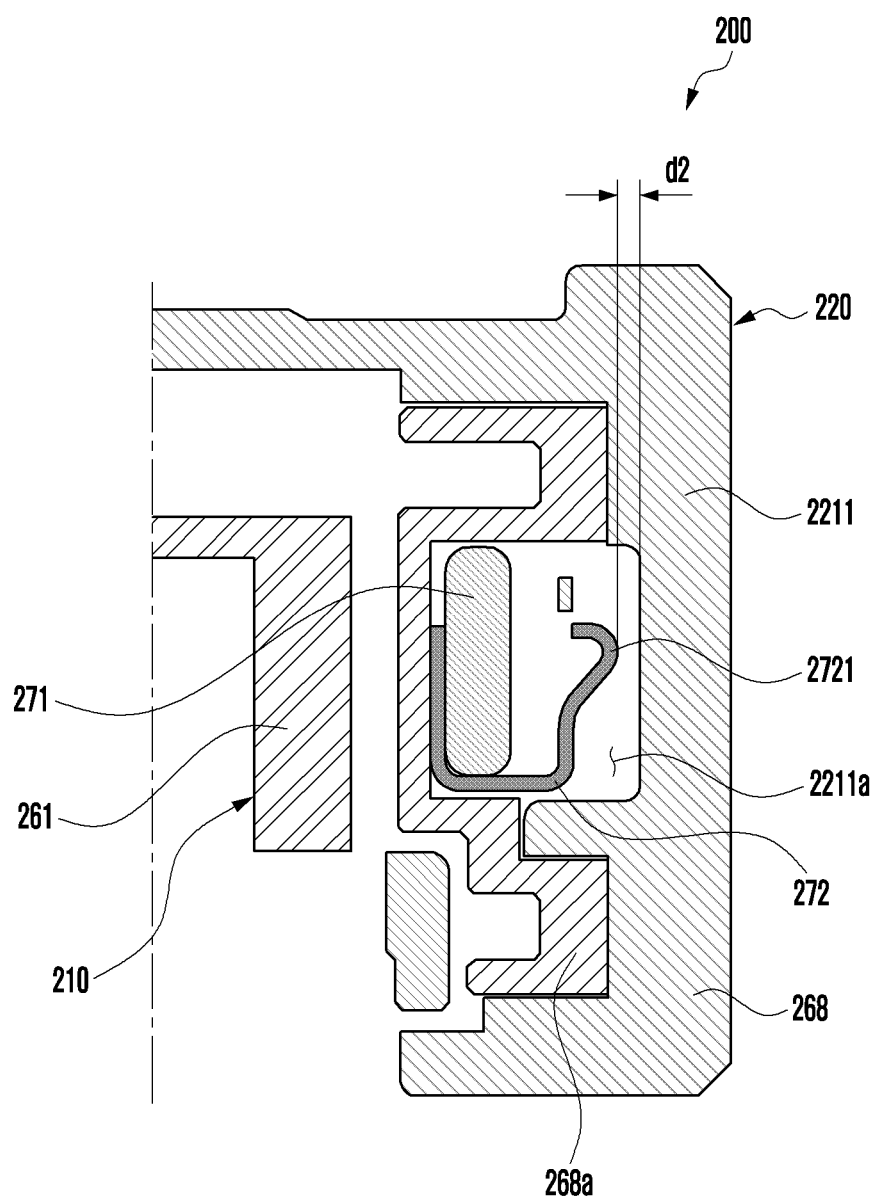
FIG. 11C is a partial cross-sectional view of an electronic device, which is viewed along line 11c-11c of FIG. 11A, according to an embodiment of the disclosure.

FIG. 11C is a part cross-sectional view of an electronic device, which is viewed along line 11c-11c of FIG. 11A, according to an embodiment of the disclosure.

Referring to FIGS. 11A to 11C, the electronic device 200 may include the electrical connection structure 270 disposed in the fourth side 2211 of the second housing 220. According to one embodiment, the electrical connection structure 270 may be positioned in a space 2211a formed by the second conductive portion 268 that forms at least a part of the fourth side 2211 of the second housing 220 and a fixing member 268a coupled to the second conductive portion 268. According to one embodiment, the first contact protrusion 2711 of the electrical connection structure 270 may protrude in the direction (direction ②) toward the first side through at least a part of the fixing member 268a. According to one embodiment, in an intermediate step in which the second housing 220 passes through the electrical disconnection section T during a slide-in or slide-out operation, the first conductive portion 261 may be electrically disconnected from the second conductive portion 268 through the electrical connection structure 270. According to one embodiment, in the electrical disconnection section T, the first contact protrusion 2711 of the conductive contact body 271 may be positioned at a location corresponding to the recess 2111a formed in the first conductive portion 261 of the first side 2111 and may be isolated from the first side 2111 by a first distance d1. In such a case, the second contact protrusion 2721 of the conductive contact frame 272 may also be isolated from the fourth side 2211 by a second distance d2 through applied pressure of the resilient member 273 that presses the conductive contact body 271 in the direction toward the first side. For example, the first distance d1 may be a distance or more within which the first conductive portion 261 and the conductive contact body 271 may not be electrically connected. The second distance d2 may be a distance or more within which the second conductive portion 268 and the conductive contact frame 272 may not be electrically connected. In an embodiment, in the electrical disconnection section T, only the first contact protrusion 2711 may be isolated from the first side 2111, and the second contact protrusion 2721 may come into contact with and may be electrically connected to the fourth side 2211.

Figure 12A:
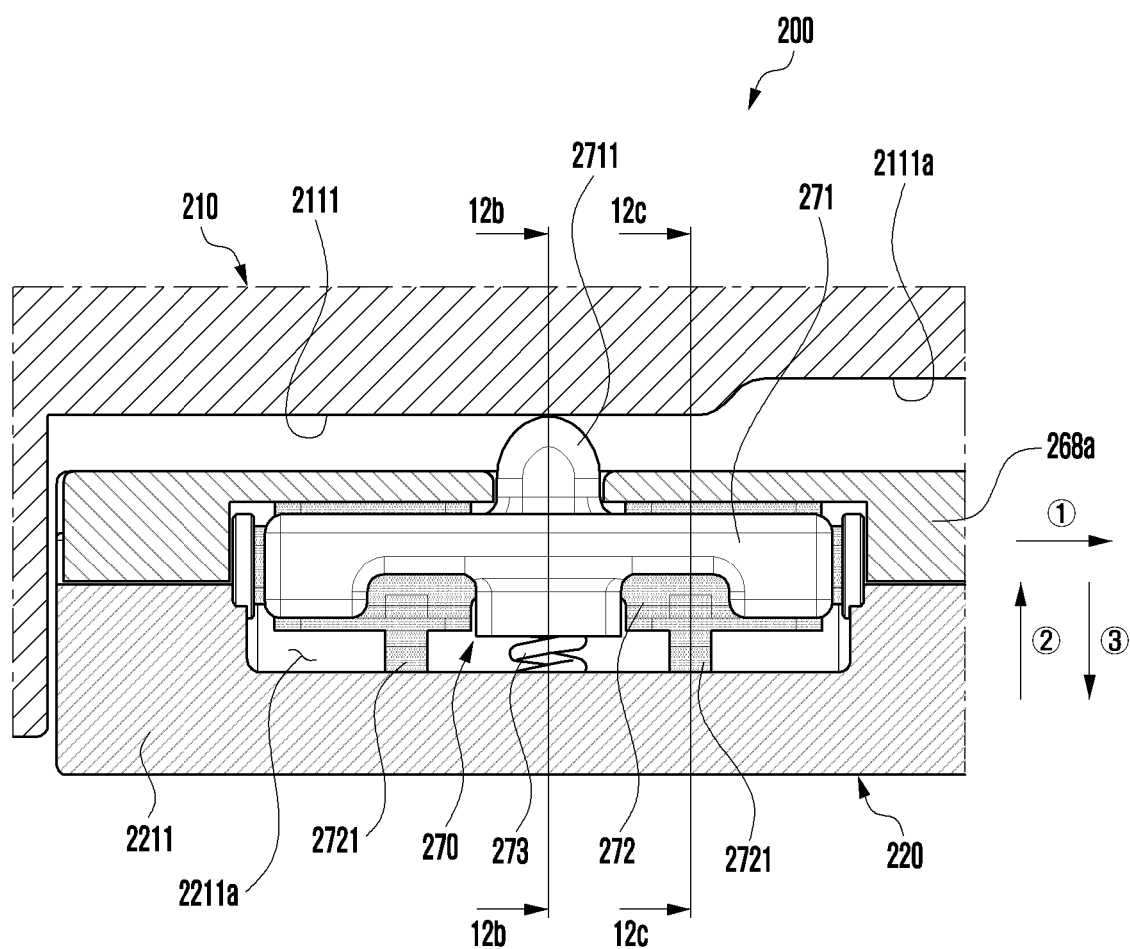
FIG. 12A is a diagram illustrating a location where an electrical connection structure is positioned in the slide-in state according to an embodiment of the disclosure.

FIG. 12A is a diagram illustrating a location where an electrical connection structure is positioned in a slide-in state according to an embodiment of the disclosure.

Figure 12B:
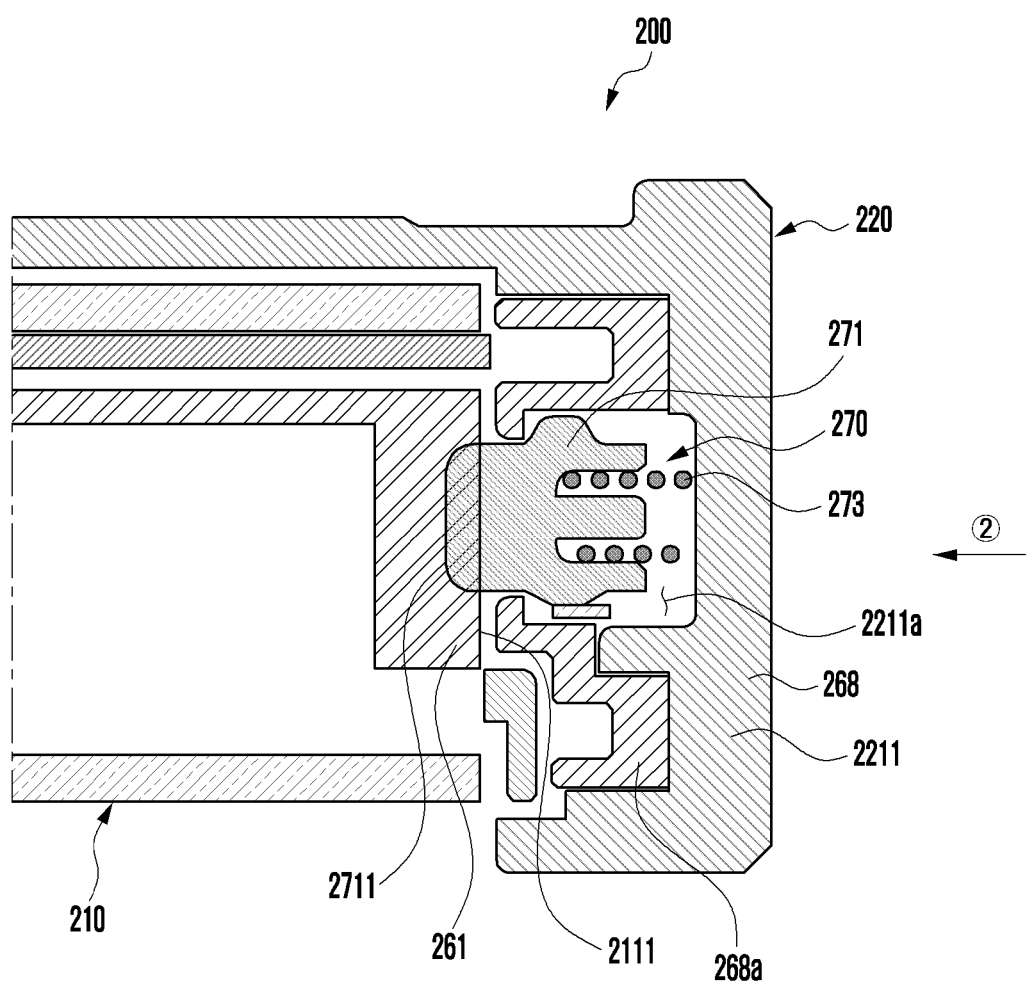
FIG. 12B is a partial cross-sectional view of an electronic device, which is viewed along line 12b-12b of FIG. 12A, according to an embodiment of the disclosure.

FIG. 12B is a partial cross-sectional view of an electronic device, which is viewed along line 12b-12b of FIG. 12A, according to an embodiment of the disclosure.

Figure 12C:
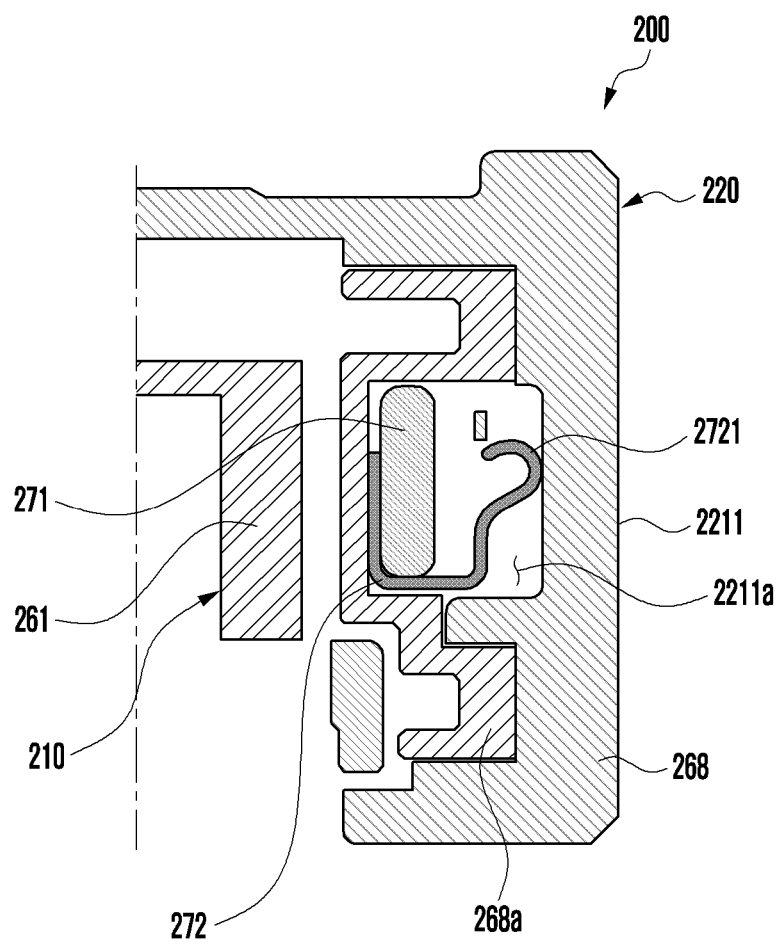
FIG. 12C is a partial cross-sectional view of the electronic device, which is viewed along line 12c-12c of FIG. 12A, according to an embodiment of the disclosure.

FIG. 12C is a partial cross-sectional view of the electronic device, which is viewed along line 12c-12c of FIG. 12A, according to an embodiment of the disclosure.

Referring to FIGS. 12A to 12C, in the slide-in state, the first conductive portion 261 may be electrically connected to the second conductive portion 268 through the electrical connection structure 270. In such a case, the first contact protrusion 2711 of the conductive contact body 271 may be electrically connected to the first conductive portion 261 of the first side 2111 by physically coming into contact with the first conductive portion 261. Furthermore, for example, the second contact protrusion 2721 of the conductive contact frame 272 may be moved in a direction (direction ③) toward the second side along with the conductive contact body 271 moved in the direction (direction ③) toward the second side by the first side 2111, and may be electrically connected to the fourth side 2211 by physically comes into contact with the fourth side 2211. In an embodiment, in the slide-in state, when the electrical connection structure 270 is viewed in the direction toward the first side 2111, a plurality of electrical connection structures 270 having designated isolated distances may be disposed at designated locations of the second housing 220 in a way to not overlap the electrical disconnection section T of the first housing 210. For example, an electronic device (e.g., the electronic device 200 in FIG. 9B) may include a first electrical connection structure (e.g., the electrical connection structure 270) and a second electrical connection structure (e.g., the electrical connection structure 270). The first electrical connection structure and the second electrical connection structure may be disposed in the fourth side 2211 in a way to not overlap the electrical disconnection section T, when viewed in the direction toward the first side 2111 in the slide-in state.

Figure 13:
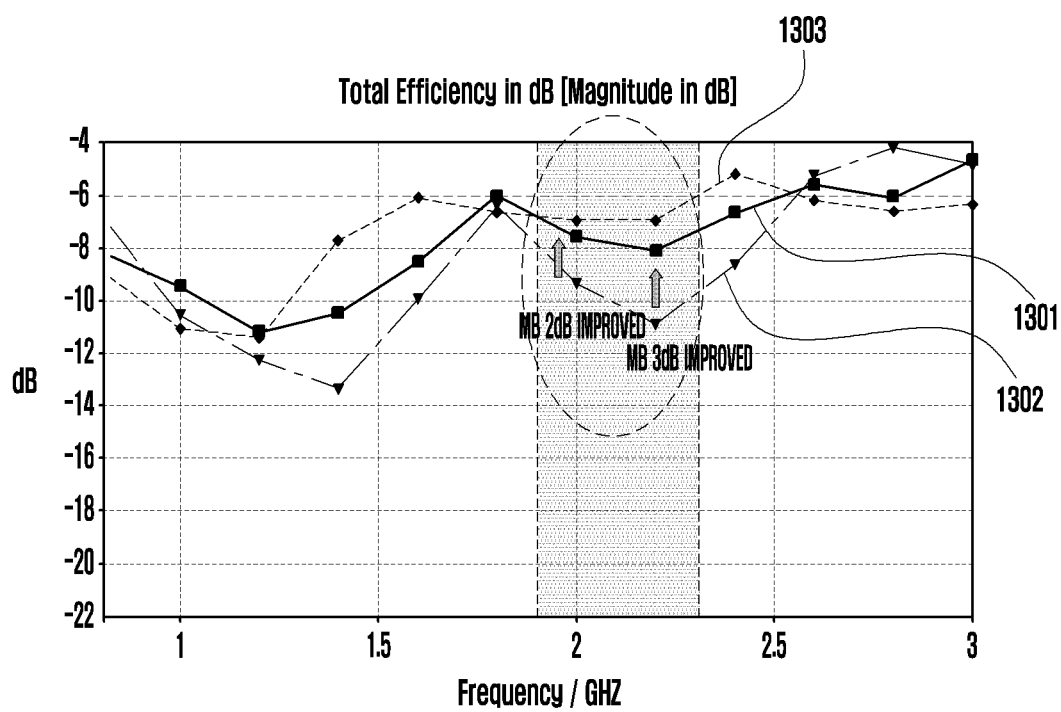
FIG. 13 is a graph illustrating a comparison between pieces of radiation efficiency of antennas depending on whether a second conductive portion is electrically connected according to an embodiment of the disclosure.

FIG. 13 is a graph illustrating a comparison between pieces of radiation efficiency of antennas depending on whether a second conductive portion is electrically connected according to an embodiment of the disclosure.

Referring to FIG. 13, it may be seen that in an antenna using the first conductive portion 261 electrically connected to a wireless communication circuit (e.g., the wireless communication module 192 in FIG. 1), radiation performance (graph 1301) when the antenna is electrically connected to the second conductive portion 268 in the slide-in state is improved close to radiation performance (graph 1303) when only the first conductive portion 261 is solely used as an antenna (e.g., an antenna operating in the slide-out state) in a designated frequency band (e.g., a mid band and/or a high band), compared to radiation performance (graph 1302) when the antenna is electrically disconnected from the second conductive portion 268 in the slide-in state. For example, the graph 1303 is a graph illustrating radiation performance when the first conductive portion 261 does not overlap or interfere with the second conductive portion 268.

Figure 14A:
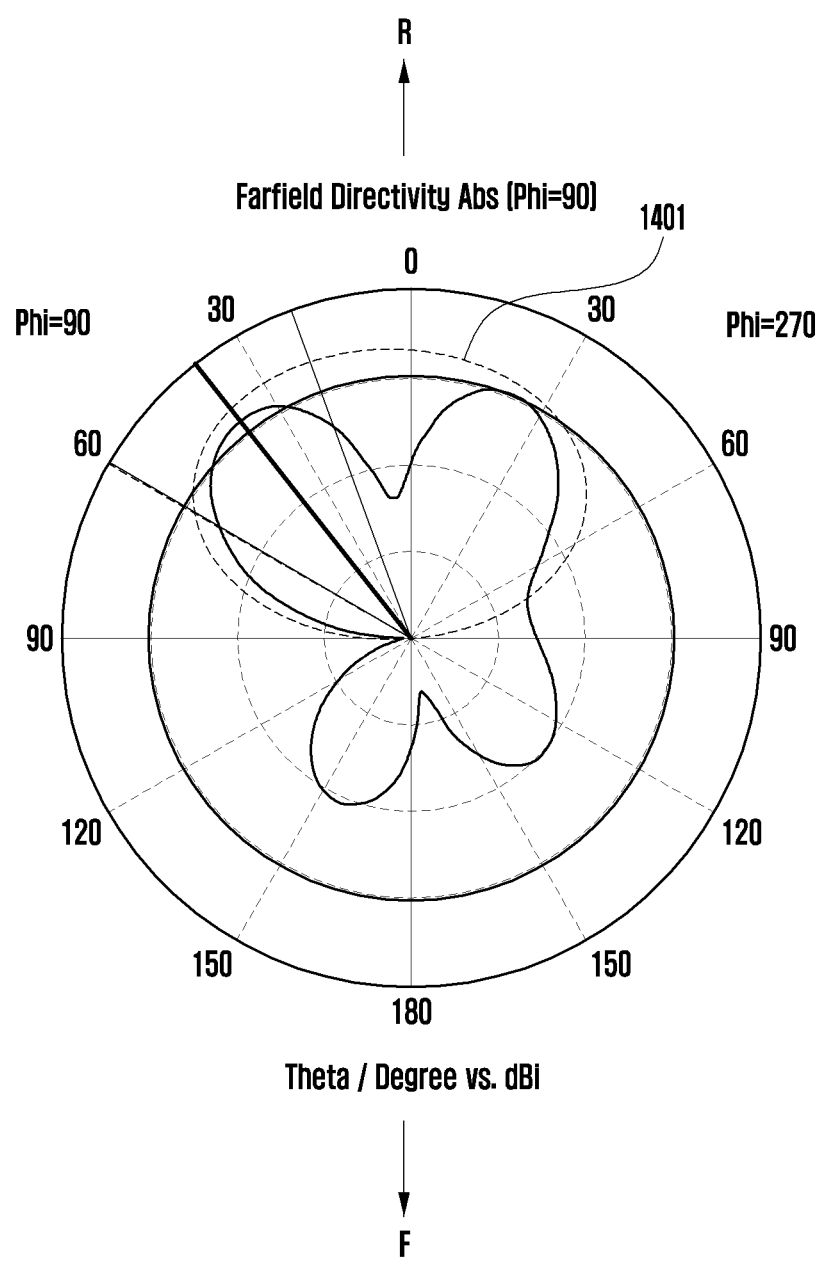
FIGS. 14A and 14B are graphs illustrating a comparison between radiation patterns of antennas depending on whether a first conductive portion and a second conductive portion are electrically connected according to various embodiments of the disclosure.
Figure 14B:
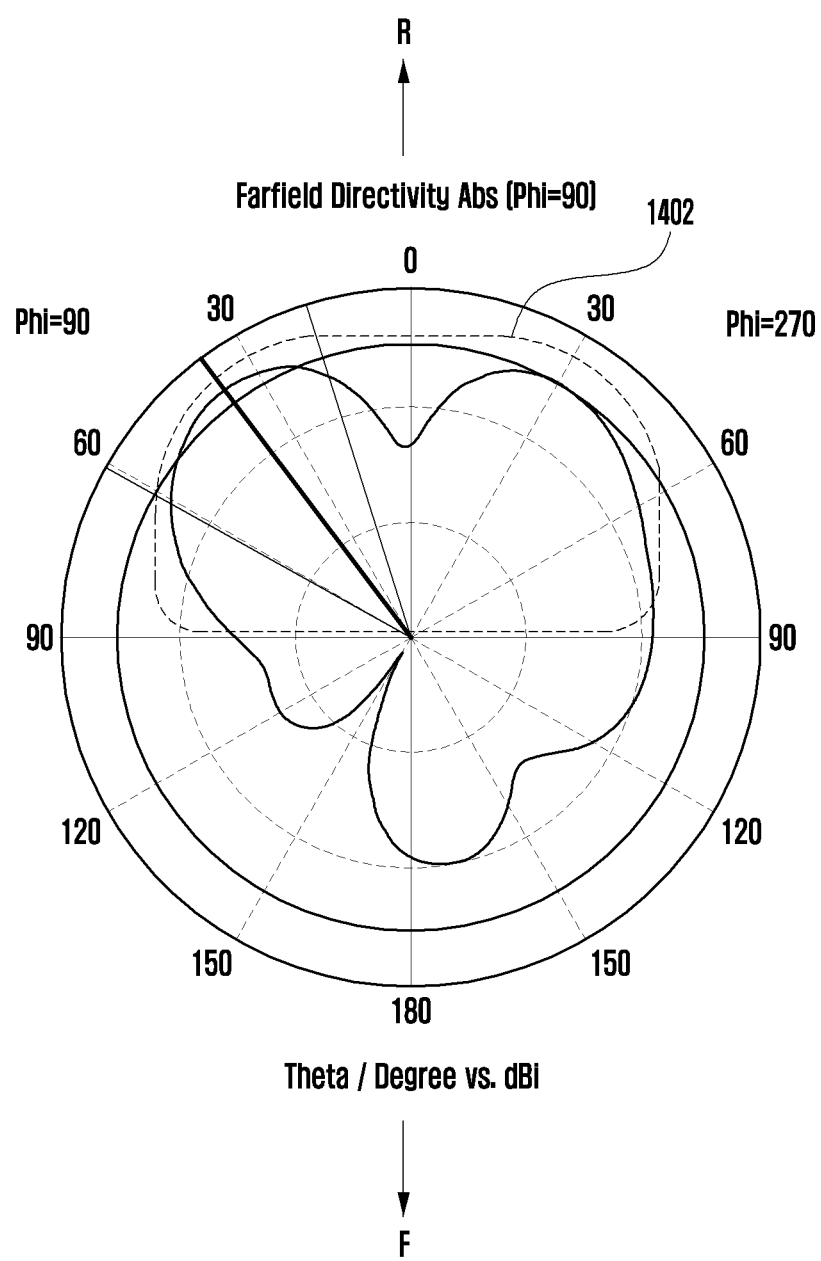

FIGS. 14A and 14B are graphs illustrating a comparison between radiation patterns of antennas depending on whether a first conductive portion and a second conductive portion are electrically connected according to various embodiments of the disclosure.

Referring to FIGS. 14A and 14B, it may be seen that in an antenna using the first conductive portion 261 electrically connected to a wireless communication circuit (e.g., the wireless communication module 192 in FIG. 1), when the first conductive portion 261 is electrically connected to the second conductive portion 268 in the slide-in state through the electrical connection structure 270 according to an embodiment of the disclosure, radiation performance has been improved because beam coverage (region 1402) formed in a designated direction is more extended than beam coverage (region 1401) formed in the designated direction when the first conductive portion 261 is electrically disconnected from the second conductive portion 268 in the slide-in state.

The electronic device according to various embodiments of the disclosure has the electrical connection structure disposed therein, which makes a surrounding conductive structure look like a part of an antenna by electrically connecting a conductive portion, used as the antenna, and a surrounding conductive structure in a slide-in operation. Accordingly, the electronic device may help expressing and maintaining stable radiation performance of an antenna regardless of a sliding operation.

According to various embodiments, an electronic device (e.g., the electronic device 200 in FIG. 8B) includes a first housing (e.g., the first housing 210 in FIG. 8B) including a first conductive portion (e.g., the first conductive portion 261 in FIG. 8B), a second housing (e.g., the second housing 220 in FIG. 8B) slidably coupled to the first housing at a designated round-trip distance and configured to include a second conductive portion (e.g., the second conductive portion 268 in FIG. 8B) overlapping at least a part of the first conductive portion in a slide-in state, a wireless communication circuit (e.g., the wireless communication circuit 192 in FIG. 1) disposed in the electronic device and electrically connected to the first conductive portion, and at least one electrical connection structure (e.g., the electrical connection structure 270 in FIG. 8B) disposed in a second space of the second housing and configured to electrically connect the second conductive portion to the first conductive portion in the slide-in state. The wireless communication circuit may be configured to transmit and/or receive a radio signal in at least one frequency band through the first conductive portion and the second conductive portion in the slide-in state.

According to various embodiments, the wireless communication circuit may be configured to transmit and receive radio signals in the at least one frequency band through the first conductive portion in a slide-out state.

According to various embodiments, the first housing may include a first side member, and the first conductive portion may be disposed through a first non-conductive portion and a second non-conductive portion spaced apart from each other at a designated interval in the first side member.

According to various embodiments, the second housing may include a second side member, and the second conductive portion may be disposed through a third non-conductive portion disposed in the second side member.

According to various embodiments, in the slide-in state, the first non-conductive portion may be disposed at a location covered by the second side member.

According to various embodiments, at least the third non-conductive portion may be disposed at a location facing at least a part of the first non-conductive portion in the slide-in state.

According to various embodiments, the electrical connection structure at least partially may be disposed to protrude into the second space in the second housing and at least partially physically comes into contact with the first conductive portion in the slide-in state.

According to various embodiments, at least some of a section corresponding to the designated round-trip distance and belonging to a section in which the first side member and the second side member face each other may include an electrical disconnection section in which the electrical connection structure may be electrically disconnected from the first side member.

According to various embodiments, the electrical disconnection section may include a section in which the electrical connection structure and the first conductive portion do not come into contact with each other.

According to various embodiments, the electrical disconnection section may be formed through a recess formed lower than an outer surface of the first conductive portion.

According to various embodiments, the electrical disconnection section may include a low-friction coating region coated with a non-conductive material in the first side member.

According to various embodiments, the low-friction coating region may include a Teflon coating region or a hard coating region.

According to various embodiments, the electrical disconnection section may be determined based on a state in which radiation performance of an antenna through the first conductive portion is radiation performance having a designated value or more.

According to various embodiments, the electrical connection structure may include a conductive contact body, including a first contact protrusion movably disposed in a direction toward the first side member in the second side member and configured to selectively come into contact with the first side member, and a conductive contact frame, including a second contact protrusion coupled to the conductive contact body and configured to selectively come into contact with the second side member.

According to various embodiments, the electronic device may further include a resilient member interposed between the conductive contact body and the second side member and configured to pressurize the conductive contact body in the direction toward the first side member.

According to various embodiments, the resilient member may be made of a non-conductive material.

According to various embodiments, the resilient member may include a compression coil spring supported by the first side member and configured to pressurize the conductive contact body in the direction toward the first side member.

According to various embodiments, the electronic device may further include a flexible display disposed to be supported by at least a part of the first housing and the second housing.

According to various embodiments, the electronic device may further include a bendable member disposed in the second space, received in the second space in the slide-in state, and configured to slide out from the second space in a way to be visible to an outside along the first housing in a slide-out state.

According to various embodiments, the flexible display may be disposed to be supported by the first housing and the bendable member, and a display area of the flexible display visible to the outside may vary through the bendable member when the slide-in state shifts to the slide-out state.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first housing comprising a first side member and a first conductive portion disposed at the first side member;
   a second housing slidably coupled to the first housing, the second housing comprising a second side member and a second conductive portion disposed at the second side member, the second conductive portion overlapping at least a part of the first conductive portion in a slide-in state;
   a wireless communication circuit disposed in the electronic device and electrically connected to the first conductive portion; and
   at least one electrical connection structure disposed in a space of the second housing and including a contact portion, the at least one electrical connection structure configured to electrically connect the second conductive portion to the first conductive portion in the slide-in state,
   wherein the wireless communication circuit is configured to transmit and/or receive a radio signal in at least one frequency band through the first conductive portion and the second conductive portion in the slide-in state,
   wherein at least some of a section corresponding to a round-trip distance and belonging to a section in which the first side member and the second side member face each other comprises an electrical disconnection section in which the electrical connection structure is electrically disconnected from the first conductive portion,
   wherein the electrical disconnection section comprises a section in which the electrical connection structure and the first conductive portion do not come into contact with each other, and
   wherein the electrical disconnection section is formed through a recess formed lower than an outer surface of the first conductive portion.

2. The electronic device of claim 1, wherein the wireless communication circuit is further configured to transmit and receive radio signals in the at least one frequency band through the first conductive portion in a slide-out state.

3. The electronic device of claim 1,
   wherein the first conductive portion is disposed through a first non-conductive portion and a second non-conductive portion spaced apart from each other at a designated interval in the first side member.

4. The electronic device of claim 3,
   wherein the second conductive portion is disposed through a third non-conductive portion disposed in the second side member.

5. The electronic device of claim 4, wherein, when in the slide-in state, the first non-conductive portion is disposed at a location covered by the second side member.

6. The electronic device of claim 5, wherein at least the third non-conductive portion is disposed at a location facing at least a part of the first non-conductive portion in the slide-in state.

7. The electronic device of claim 4, wherein the electrical connection structure is disposed to at least partially protrude into the space in the second housing and at least partially physically comes into contact with the first conductive portion in the slide-in state.

8. The electronic device of claim 1, wherein the electrical disconnection section is determined based on a state in which a radiation performance of an antenna through the first conductive portion is a radiation performance greater than a designated value.

9. The electronic device of claim 1, wherein the at least one electrical connection structure comprises:
- a conductive contact body, comprising a first contact protrusion movably disposed in a direction toward the first side member in the second side member, the conductive contact body configured to selectively come into contact with the first side member; and
- a conductive contact frame comprising a second contact protrusion coupled to the conductive contact body and configured to selectively come into contact with the second side member.

10. The electronic device of claim 9, further comprising:
- a resilient member interposed between the conductive contact body and the second side member, the resilient member configured to pressurize the conductive contact body in the direction toward the first side member.

11. The electronic device of claim 10, wherein the resilient member is made of a non-conductive material.

12. The electronic device of claim 11, wherein the resilient member comprises a compression coil spring supported by the first side member, the resilient member is further configured to pressurize the conductive contact body in the direction toward the first side member.

13. The electronic device of claim 1, further comprising:
- a flexible display disposed to be supported by at least a part of the first housing and the second housing.

14. The electronic device of claim 13, further comprising:
- a bendable member disposed in the space, received in the space in the slide-in state, the bendable member configured to slide out from the space in a way to be visible to an outside along the first housing in a slide-out state.

15. The electronic device of claim 14,
wherein the flexible display is disposed to be supported by the first housing and the bendable member, and
wherein a display area of the flexible display visible to the outside varies through the bendable member when the slide-in state shifts to the slide-out state.

16. An electronic device comprising:
a first housing comprising a first side member and a first conductive portion disposed at the first side member;
a second housing slidably coupled to the first housing, the second housing comprising a second side member and a second conductive portion disposed at the second side member, the second conductive portion overlapping at least a part of the first conductive portion in a slide-in state;
a wireless communication circuit disposed in the electronic device and electrically connected to the first conductive portion; and
at least one electrical connection structure disposed in a space of the second housing, the at least one electrical connection structure configured to electrically connect the second conductive portion to the first conductive portion in the slide-in state,
wherein the wireless communication circuit is configured to transmit and/or receive a radio signal in at least one frequency band through the first conductive portion and the second conductive portion in the slide-in state,
wherein the first conductive portion is disposed through a first non-conductive portion and a second non-conductive portion spaced apart from each other at a designated interval in the first side member,
wherein the second conductive portion is disposed through a third non-conductive portion disposed in the second side member,
wherein the electrical connection structure is disposed to at least partially protrude into the space in the second housing and at least partially physically comes into contact with the first conductive portion in the slide-in state,
wherein at least some of a section corresponding to a round-trip distance and belonging to a section in which the first side member and the second side member face each other comprises an electrical disconnection section in which the electrical connection structure is electrically disconnected from the first conductive portion,
wherein the electrical disconnection section comprises a section in which the electrical connection structure and the first conductive portion do not come into contact with each other, and
wherein the electrical disconnection section is formed through a recess formed lower than an outer surface of the first conductive portion.

* * * * *